US011115866B2

(12) United States Patent
Harel

(10) Patent No.: US 11,115,866 B2
(45) Date of Patent: Sep. 7, 2021

(54) COORDINATION OF SHARED SPECTRUM DISTRIBUTION TO REMOTE UNITS IN DISTRIBUTED RADIO COMMUNICATIONS SYSTEMS

(71) Applicant: Corning Research & Development Corporation, Corning, NY (US)

(72) Inventor: Dror Harel, Hod Hasharon (IL)

(73) Assignee: Corning Research & Development Corporation, Corning, NY (US)

( * ) Notice: Subject to any disclaimer, the term of this patent is extended or adjusted under 35 U.S.C. 154(b) by 53 days.

(21) Appl. No.: 16/528,481

(22) Filed: Jul. 31, 2019

(65) Prior Publication Data
US 2021/0037444 A1    Feb. 4, 2021

(51) Int. Cl.
*H04W 28/16* (2009.01)
*H04W 16/14* (2009.01)
(Continued)

(52) U.S. Cl.
CPC ........... *H04W 28/16* (2013.01); *H04W 16/14* (2013.01); *H04W 40/16* (2013.01);
(Continued)

(58) Field of Classification Search
CPC ........ H04B 1/18; H04W 88/10; H04W 4/025; H04W 76/15; H04W 16/14; H04W 4/02
See application file for complete search history.

(56) References Cited

U.S. PATENT DOCUMENTS

| 4,668,176 A | 5/1987 | Zeibig et al. |
| 6,663,378 B2 | 12/2003 | Grover et al. |

(Continued)

FOREIGN PATENT DOCUMENTS

| WO | 2018/087663 A1 | 5/2018 |
| WO | 2018175639 A1 | 9/2018 |

OTHER PUBLICATIONS

Tehrani et al "Licensed Spectrum Sharing Schemes for Mobile Operators: A Survey and Outlook", IEEE, 2016 (Year: 2016).*
(Continued)

*Primary Examiner* — Omer S Mian
(74) *Attorney, Agent, or Firm* — C. Keith Montgomery

(57) ABSTRACT

Distributed radio communications systems supporting coordination of distribution of shared spectrum from multiple service providers to remote units to be distributed to subscriber devices are disclosed. In examples, the distributed communications system includes a routing circuit that is configured to receive downlink communications signals from signal sources of respective multiple service providers and route the downlink communications signals to a plurality of remote units. The remote unit is configured to distribute the received downlink communications signals for the multiple service providers to subscriber devices such that the distributed communications system supports multiple service providers. The distributed communications system also includes a spectrum usage coordination circuit configured to coordinate the usage of spectrum between the remote units in the distributed communications system. The spectrum usage coordination circuit is configured selectively decide which channels of the shared spectrum are to be routed to specific remote units based on shared spectrum input information.

23 Claims, 10 Drawing Sheets

(51) Int. Cl.
*H04W 40/16* (2009.01)
*H04W 72/04* (2009.01)
*H04W 72/08* (2009.01)

(52) U.S. Cl.
CPC ..... *H04W 72/042* (2013.01); *H04W 72/0486* (2013.01); *H04W 72/082* (2013.01)

(56) References Cited

U.S. PATENT DOCUMENTS

| | | | |
|---|---|---|---|
| 7,303,782 | B2 | 12/2007 | Avery et al. |
| 7,655,195 | B1 | 2/2010 | Ichikawa et al. |
| 8,398,390 | B2 | 3/2013 | Hayashi et al. |
| 8,672,660 | B2 | 3/2014 | Citriniti et al. |
| 9,393,716 | B2 | 7/2016 | Beecher et al. |
| 9,642,094 | B1 | 5/2017 | Harel |
| 9,648,580 | B1 | 5/2017 | Shekalim |
| 9,730,011 | B2 | 8/2017 | Harel et al. |
| 9,807,558 | B2 | 10/2017 | Shekalim |
| 9,867,081 | B1 | 1/2018 | Harel |
| 9,924,308 | B2 | 3/2018 | Harel et al. |
| 10,123,162 | B2 | 11/2018 | Harel et al. |
| 10,299,143 | B2 | 5/2019 | Chamarti |
| 10,813,103 | B1* | 10/2020 | Sevindik ........... H04W 28/0236 |
| 2004/0164464 | A1 | 8/2004 | Lubberts et al. |
| 2017/0048732 | A1 | 2/2017 | Shekalim |
| 2017/0197349 | A1 | 7/2017 | Ito et al. |
| 2017/0279517 | A1* | 9/2017 | Lange ..................... H04B 7/155 |
| 2017/0289817 | A1 | 10/2017 | Shekalim |
| 2017/0290023 | A1* | 10/2017 | Zhu ........................ H04W 16/14 |
| 2017/0318561 | A1 | 11/2017 | Harel et al. |
| 2018/0014304 | A1* | 1/2018 | Khoshnevisan ...... H04W 24/08 |
| 2018/0043595 | A1 | 2/2018 | Imaizumi et al. |
| 2018/0096543 | A1 | 4/2018 | Chamarti |
| 2018/0199211 | A1 | 7/2018 | Chamarti |
| 2019/0007104 | A1 | 1/2019 | Chamarti et al. |
| 2019/0141713 | A1 | 5/2019 | Cimpu et al. |
| 2020/0221312 | A1* | 7/2020 | Kim .................... H04W 88/085 |

OTHER PUBLICATIONS

Harel; "Channel-Based Remote Unit Monitoring and Optimization in a Wireless Communications System (WCS)" Filed as U.S. Appl. No. 16/123,287, filed Sep. 6, 2018; 34 Pages.

3rd Generation Partnership Project (3GPP), "CBRS Spectrum Sharing Model in US", Federated Wireless: 3GPP Draft; RP-151514, Mobile Competence Centre ; 650, Route Des Lucioles ; F-06921 Sophia-Antipolis Cede vol. TSG RAN, No. Phoenix, AZ; Sep. 14, 2015-Sep. 16, 2015, 6 pages.

International Search Report and Written Opinion of the International Searching Authority; PCT/US2020/041115; dated Oct. 12, 2020; 12 Pages; European Patent Office.

Wireless Innovation Forum, "Operations for Citizens Broadband Radio Service (CBRS); GAA Spectrum Coordination (GSC), Technical Report-Approach 3", Document WINNF-TR-2005, Version 1.0.0, May 16, 2019, 15 pages.

\* cited by examiner

700

702 — RECEIVING A PLURALITY OF DOWNLINK COMMUNICATIONS SIGNALS (302(1), 302(2)) FROM A RESPECTIVE PLURALITY OF SERVICE PROVIDERS, EACH DOWNLINK COMMUNICATIONS SIGNALS (302(1), 302(2)) AMONG THE PLURALITY OF DOWNLINK COMMUNICATIONS SIGNALS (302(1), 302(2)) COMPRISING A SAME PLURALITY OF SHARED SPECTRUM CHANNELS (CH1-CH4) IN A SHARED SPECTRUM

704 — RECEIVING SHARED SPECTRUM INPUT INFORMATION (312)

706 — DETERMINING WHICH SHARED SPECTRUM CHANNELS (CH1-CH4) OF THE PLURALITY OF DOWNLINK COMMUNICATIONS SIGNALS (302(1), 302(2)) TO ALLOCATE TO THE PLURALITY OF REMOTE UNITS (304(1)-304(R)) BASED ON THE SHARED SPECTRUM INPUT INFORMATION (312)

708 — ALLOCATING THE DETERMINED SHARED SPECTRUM CHANNELS (CH1-CH4) OF THE PLURALITY OF DOWNLINK COMMUNICATIONS SIGNALS (302(1), 302(2)) TO THE PLURALITY OF REMOTE UNITS (304(1), 304(2)) BASED ON THE DETERMINED SHARED SPECTRUM CHANNELS (CH1-CH4) OF THE PLURALITY OF DOWNLINK COMMUNICATIONS SIGNALS (302(1), 302(2)) TO ALLOCATE TO THE PLURALITY OF REMOTE UNITS IN ROUTING INFORMATION (316)

710 — SELECTIVELY DISTRIBUTING ONE OR MORE SHARED SPECTRUM CHANNELS (CH1-CH4) OF THE PLURALITY OF DOWNLINK COMMUNICATIONS SIGNALS (302(1), 302(2)) TO THE PLURALITY OF REMOTE UNITS (304(1), 304(2)) BASED ON THE ROUTING INFORMATION (316)

*FIG. 7*

COORDINATION OF SHARED SPECTRUM DISTRIBUTION TO REMOTE UNITS IN DISTRIBUTED RADIO COMMUNICATIONS SYSTEMS

BACKGROUND

The disclosure relates generally to distributed radio communications systems that are configured to support distribution of radio communications signals to remote units to be distributed to subscriber devices, and more particularly to distributed radio communications systems that are configured to selectively decide and route particular channels of shared spectrum to particular remote units to avoid or reduce interference that may result from shared spectrum communications signals being communicated by multiple service providers at the same time to be distributed to the remote units.

Wireless communications is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio node/base station that transmits communications signals distributed over a physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a distributed communications system (DCS) 100 that includes a radio node 102 configured to support one or more service providers 104(1)-104(N) as signal sources (also known as "carriers" or "service operators"—e.g., mobile network operator (MNO)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through antennas 112 to the wireless client devices 106(1)-106(W) in communication range of the antennas 112. For example, the antenna 112 may be an antenna array. As another example, the radio node 102 in the communications system 100 in FIG. 1 can be a small cell radio access node ("small cell") that is configured to support multiple service providers 104(1)-104(N) by distributing a communications signal stream 108(1)-108(S) for the multiple service providers 104(1)-104(N) based on respective downlink communications signals 110(1)-110(N) received from a respective evolved packet core (EPC) network $CN_1$-$CN_N$ of the service provider 104(1)-104(N) through interface connections. The radio node 102 includes a radio circuit 118(1)-118(N) for each service provider 104(1)-104(N) that is configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the communications system 100 in FIG. 1 may be configured to support service providers 104(1)-104(N) that have different frequency spectrum and do not share spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have shared spectrum. In this regard, the capacity supported by the radio node 102 for the shared spectrum is split (i.e. shared) between the multiple service providers 104(1)-104(N) for providing services to the subscribers. An example of a shared spectrum is the citizen band radio service (CBRS). CBRS is a "cellular like" service that is provided under a shared spectrum scheme in the 3.55-3.70 GigaHertz (GHz) frequency band, which therefore has a bandwidth of 150 MegaHertz (MHz). FIG. 2A illustrates the 150 MegaHertz (150 MHz) frequency band 200 between 3.55 GHz and 3.70 GHz to which the Federal Communications Commission (FCC) is opening access as the CBRS. The radio node 102 in FIG. 1 may be configured to support CBRS as an example. As shown in FIG. 2B, the overall 150 MHz CBRS frequency band 200 is currently divided into a lower 100 MHz section 202 and an upper 50 MHz section 204, with the lower 100 MHz section 202 being used by Navy radars in coastal areas and space-to-earth fixed-satellite service (FSS) stations. The upper 50 MHz section 204 is currently used by WiMax fixed wireless baseband services, three ground radar stations, eighty-six grandfathered space-to-earth FSS stations, and Navy radar for ships located further than 44 miles from the coast. However, as illustrated in FIG. 2C, the FCC is opening up fifteen (15) 10-MHz unpaired channels 206(1)-206(15) for radio services through citizens broadband radio service devices (CBSDs), which are devices configured to operate within the CBRS frequencies and according to CBRS rules. The CBSDs, or parts thereof may be incorporated in radio nodes within radio access networks (RANs) along with other devices and networks. In this regard as illustrated in FIG. 2C, in the new CBRS framework, the 150 MHz CBRS frequency band 200 will be divided into fifteen 10-MHz channels 206(1)-206(15). Other divisions are also possible, and a division to fifteen 10-MHz channels 206(1)-206(15) is illustrated as an example of one possible division. Channels 206(1)-206(10) in the lower 100 MHz section 202 will operate according to a three-tier model, and channels 206(11)-206(15) in the upper 50 MHz section 204 will operate according to a two-tier model.

Spectrum allocation or channel allocation in a CBRS communications system is performed by a technique or procedures that occur independently or semi-independently of service providers by a Spectrum Allocation System (SAS). As an example, a CBRS system has 150 MHz of spectrum, and has 1,500 possible E-UTRA Absolute Radio Frequency Channel Number (EARFCNs). Thus, for example, if a CBRS communications system is operated in a stadium or arena by a third party, the CBRS system may be dynamically assigned a channel, or operating spectrum, by a SAS. If the radio node 102 in FIG. 1 is configured to support CBRS, the radio node 102 will have an interface to a managing SAS. Based on the location of the radio node 102 and its license grade, the SAS instructs which channel frequencies the radio node 102 should use and at what maximum transmission power level.

The radio node 102 in FIG. 1 can also be coupled to a distributed communications system, such as a DAS, such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Thus, in this scenario, if the radio node 102 were configured to support a shared spectrum such as CBRS, every restriction enforced by the SAS on the radio node 102 as a result of spectrum coordination would affect all the remote units of the distributed communications system coupled to the radio node 102. In other words, whichever channels have been dynamically allocated by the SAS to the radio node 102 for the shared spectrum are the only channels of the shared spectrum that will be distributed to the remote units of the distributed communications system coupled to the radio node 102. Also, if the radio node 102 in FIG. 1 is configured as a shared spectrum system to support service providers 104(1)-104(N) having shared spectrum, at any given time and location, the shared spectrum of the radio node 102 can only be used by a single service provider 104(1)-104(N). Otherwise, the downlink communications signals 110(1)-110(N) in the shared spectrum from multiple active service providers 104(1)-104(N) will interfere with each other. Moreover, downlink communications signals 110(1)-110(N) in the shared spectrum may interfere with each other when communicated to the same remote unit in a coupled distributed communications system. Also, downlink communications signals 110(1)-110(N) in the shared spectrum communicated to the remote units may cause a subset of the remote units in the distributed communications system to experience interference with each other.

No admission is made that any reference cited herein constitutes prior art. Applicant expressly reserves the right to challenge the accuracy and pertinency of any cited documents.

SUMMARY

Embodiments disclosed herein include distributed radio communications systems supporting coordination of distribution of shared spectrum from multiple service providers to remote units to be distributed to subscriber devices. In examples, the distributed radio communications system ("distributed communications system (DCS)") includes a routing circuit that is configured to receive downlink communications signals from signal sources of respective multiple service providers and route the downlink communications signals to a plurality of remote units. The remote units are configured to distribute the received downlink communications signals for the multiple service providers to subscriber devices such that the distributed communications system supports multiple service providers. The remote units are also configured to distribute uplink communications signals received from the subscriber devices to the routing circuit to be distributed back the service providers. The service providers coupled to the DCS may support an unshared spectrum (e.g., licensed spectrum) that is not shared (i.e., has an unshared frequency band) with another, different service provider also coupled to the DCS. However, the service providers coupled to the DCS may also support a shared spectrum (e.g., unlicensed spectrum) that is supported by another different service provider also coupled to the DCS. Thus, the DCS receiving downlink communications signals from the multiple service providers at the same time in the shared spectrum may cause intra-site interference in the remote units. Inter-site interference can also occur between a remote unit receiving a downlink communications signal of a service provider in the shared spectrum and another received communications signal in the same shared spectrum outside the DCS. Limiting the ability of distributing shared spectrum communications signals from multiple service providers to the remote units to avoid interference limits the capacity of the distributed communications system without limiting performance.

Thus, to allow distribution of shared spectrum communications signals from different service providers to the remote units in the distributed communications system at the same time while avoiding or reducing interference, the distributed communications system also includes a spectrum usage coordination circuit. The spectrum usage coordination circuit is configured to coordinate the usage of spectrum between the remote units on a per remote unit basis or granularity in the distributed communications system. The spectrum usage coordination circuit is configured selectively decide which channels of the shared spectrum are to be routed to specific remote units based on shared spectrum input information. As non-limiting examples, the shared spectrum input information may include a definition of available channels to be used as shared spectrum, a spectrum sharing policy between the different service providers, load information of the remote units, DCS intra-site interference information received by the remote units, inter-site interference information received by the remote units, and/or interference information experienced by the subscriber devices.

One exemplary embodiment of the disclosure relates to a DCS comprising a routing circuit configured to receive a plurality of downlink communications signals from a respective plurality of service providers, each downlink communications signal among the plurality of downlink communications signals comprising a same plurality of shared spectrum channels in a shared spectrum. The routing circuit is also configured to selectively distribute one or more shared spectrum channels of the plurality of shared spectrum channels of the plurality of downlink communications signals to a plurality of remote units based on routing information. The DCS also comprises a spectrum usage coordination circuit communicatively coupled to the routing circuit. The spectrum usage coordination circuit is configured to receive shared spectrum input information, determine which shared spectrum channels of the plurality of downlink communications signals to allocate to the plurality of remote units based on the shared spectrum input information, allocate the determined shared spectrum channels of the plurality of downlink communications signals to the plurality of remote units based on the determined shared spectrum channels of plurality of downlink communications signals to allocate to the plurality of remote units in the routing information, and communicate the routing information to the routing circuit.

An additional exemplary embodiment of the disclosure relates to a method of routing shared spectrum channels of downlink communications signals of a plurality of service providers to a plurality of remote units in a DCS comprising receiving a plurality of downlink communication signals from a respective plurality of service providers, each downlink communications signal among the plurality of downlink communications signals comprising a same plurality of shared spectrum channels in a shared spectrum. The method also comprises receiving shared spectrum input information and determining which shared spectrum channels of the plurality of downlink communications signals to allocate to a plurality of remote units based on the shared spectrum input information. The method also comprises allocating the determined shared spectrum channels of the plurality of downlink communications signals to the plurality of remote units based on the determined shared spectrum channels of plurality of downlink communications signals to allocate to the plurality of remote units in routing information, and selectively distributing one or more shared spectrum channels of the plurality of downlink communications signals to the plurality of remote units based on the routing information.

An additional exemplary embodiment of the disclosure relates to a communications system comprising a first DCS comprising a first routing circuit configured to receive a plurality of first downlink communications signals from a respective plurality of first service providers, each first downlink communications signal among the plurality of first downlink communications signals comprising a same plurality of shared spectrum channels in a shared spectrum. The first routing circuit is also configured to selectively distribute one or more shared spectrum channels of the plurality of shared spectrum channels of the plurality of first downlink communications signals to a plurality of first remote units based on first routing information. The communications system also comprises a second DCS, comprising a second routing circuit configured to receive a plurality of second downlink communications signals from a respective plurality of second service providers, each second downlink communications signal among the plurality of second downlink communications signals comprising a same plurality of shared spectrum channels in the shared spectrum. The second routing circuit is also configured to selectively distribute one or more shared spectrum channels of the plurality of shared spectrum channels of the plurality of second downlink communications signals to a plurality of second remote units based on second routing information. The communications system also comprises a spectrum usage coordination circuit communicatively coupled to the first routing circuit and the second routing circuit. The spectrum usage coordination circuit is configured to receive shared spectrum input information, determine which shared spectrum channels of the plurality of first downlink communications signals to allocate to the plurality of first remote units based on the shared spectrum input information, and determine which shared spectrum channels of the plurality of second downlink communications signals to allocate to the plurality of second remote units based on the shared spectrum input information. The spectrum usage coordination circuit is also configured to allocate the determined shared spectrum channels of the plurality of first downlink communications signals to the plurality of first remote units based on the determined shared spectrum channels of plurality of first downlink communications signals to allocate to the plurality of first remote units in the first routing information, and allocate the determined shared spectrum channels of the plurality of second downlink communications signals to the plurality of second remote units based on the determined shared spectrum channels of plurality of second downlink communications signals to allocate to the plurality of second remote units in the second routing information. The spectrum usage coordination circuit is also configured to communicate the first routing information to the first routing circuit and communicate the second routing information to the second routing circuit.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7 is a flowchart illustrating an exemplary process of a spectrum usage coordination circuit in a shared spectrum DCS, such as the distributed communications system in FIG. 3, receiving shared spectrum input information and determining allocation of the shared spectrum from multiple service providers to remote units based on the shared spectrum input information to control routing of channels of the shared spectrum downlink communications signals to the remote units;

DETAILED DESCRIPTION

Figure 1:
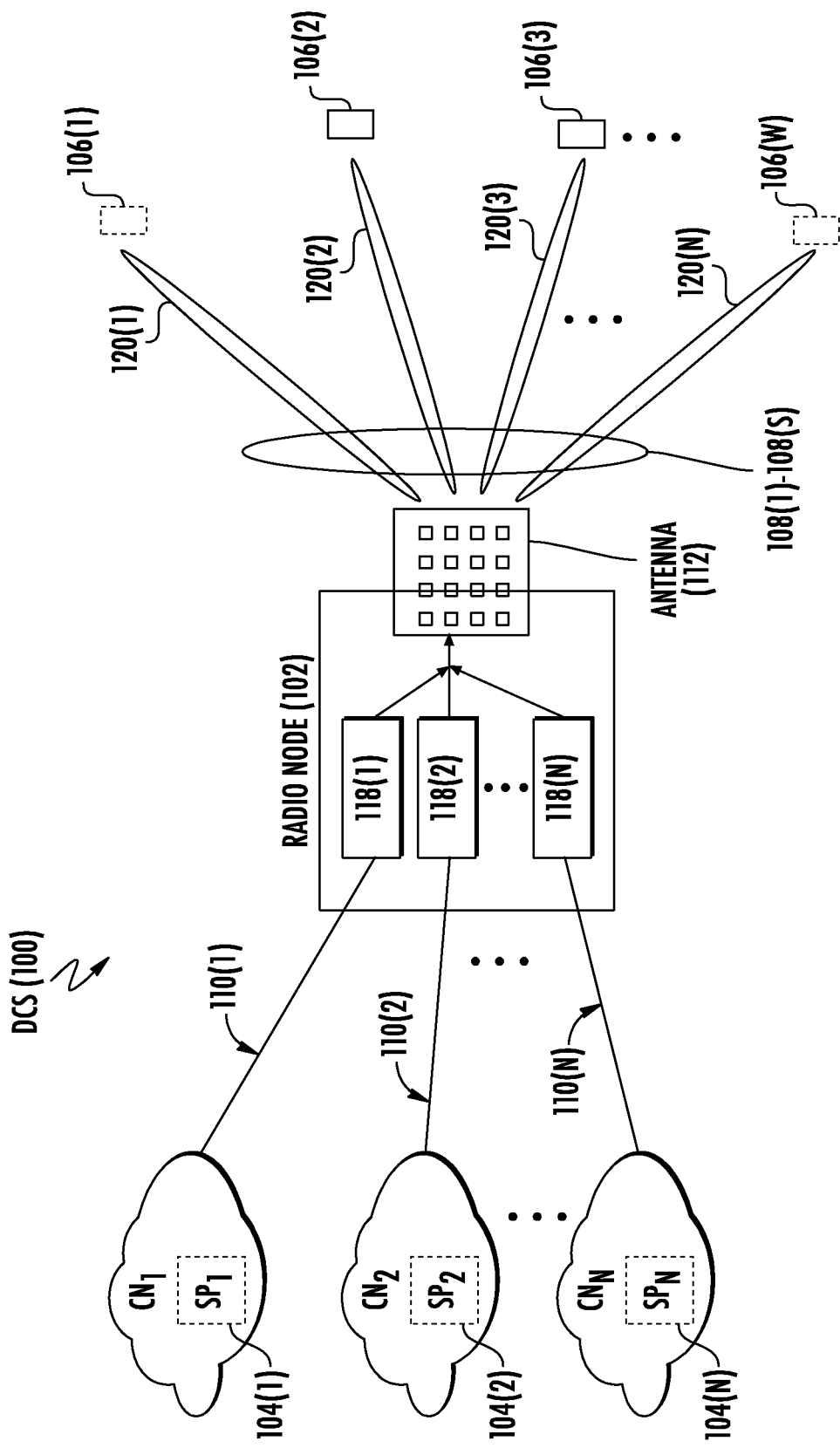
FIG. 1 is a schematic diagram of an exemplary communications system that includes a conventional single operator radio node configured to support distribution of communications signals for multiple service providers.
Figure 2A:
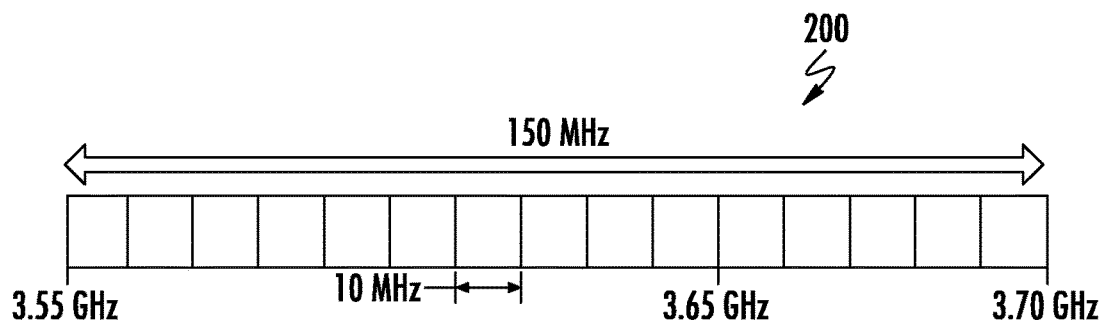
FIGS. 2A-2C illustrate existing and proposed spectrum allocation schemes within the citizens broadband radio service (CBRS)
Figure 2B:
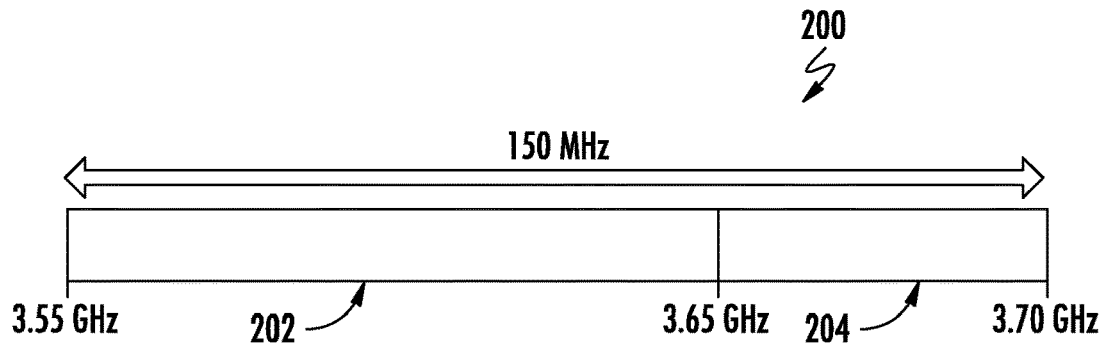
Figure 2C:
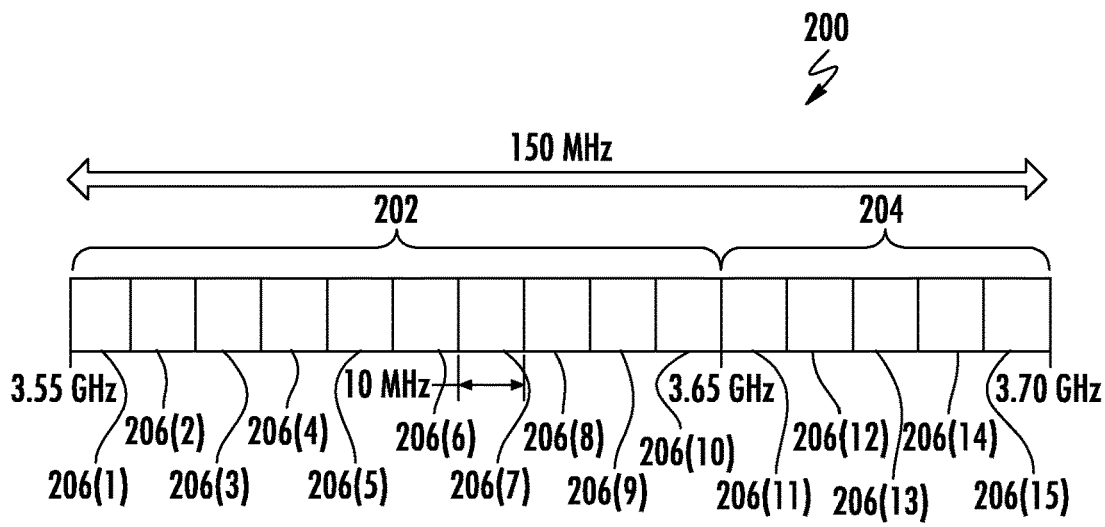

Embodiments disclosed herein include distributed radio communications systems supporting coordination of distribution of shared spectrum from multiple service providers to remote units to be distributed to subscriber devices. In examples, the distributed radio communications system ("distributed communications system (DCS)") includes a routing circuit that is configured to receive downlink communications signals from signal sources of respective multiple service providers and route the downlink communications signals to a plurality of remote units. The remote units are configured to distribute the received downlink communications signals for the multiple service providers to subscriber devices such that the distributed communications system supports multiple service providers. The remote units are also configured to distribute uplink communications signals received from the subscriber devices to the routing circuit to be distributed back the service providers. The service providers coupled to the DCS may support an unshared spectrum (e.g., licensed spectrum) that is not shared (i.e., has an unshared frequency band) with another, different service provider also coupled to the DCS. However, the service providers coupled to the DCS may also support a shared spectrum (e.g., unlicensed spectrum) that is supported by another different service provider also coupled to the DCS. Thus, the DCS receiving downlink communications signals from the multiple service providers at the same time in the shared spectrum may cause intra-site interference in the remote units. Inter-site interference can also occur between a remote unit receiving a downlink communications signal of a service provider in the shared spectrum and another received communications signal in the same shared spectrum outside the DCS. Limiting the ability of distributing shared spectrum communications signals from multiple service providers to the remote units to avoid interference limits the capacity of the distributed communications system without limiting performance.

Thus, to allow distribution of shared spectrum communications signals from different service providers to the remote units in the distributed communications system at the same time while avoiding or reducing interference, the distributed communications system also includes a spectrum usage coordination circuit. The spectrum usage coordination circuit is configured to coordinate the usage of spectrum between the remote units on a per remote unit basis or granularity in the distributed communications system. The spectrum usage coordination circuit is configured selectively decide which channels of the shared spectrum are to be routed to specific remote units based on shared spectrum input information. As non-limiting examples, the shared spectrum input information may include a definition of available channels to be used as shared spectrum, a spectrum sharing policy between the different service providers, load information of the remote units, DCS intra-site interference information received by the remote units, inter-site interference information received by the remote units, and/or interference information experienced by the subscriber devices.

Figure 3:
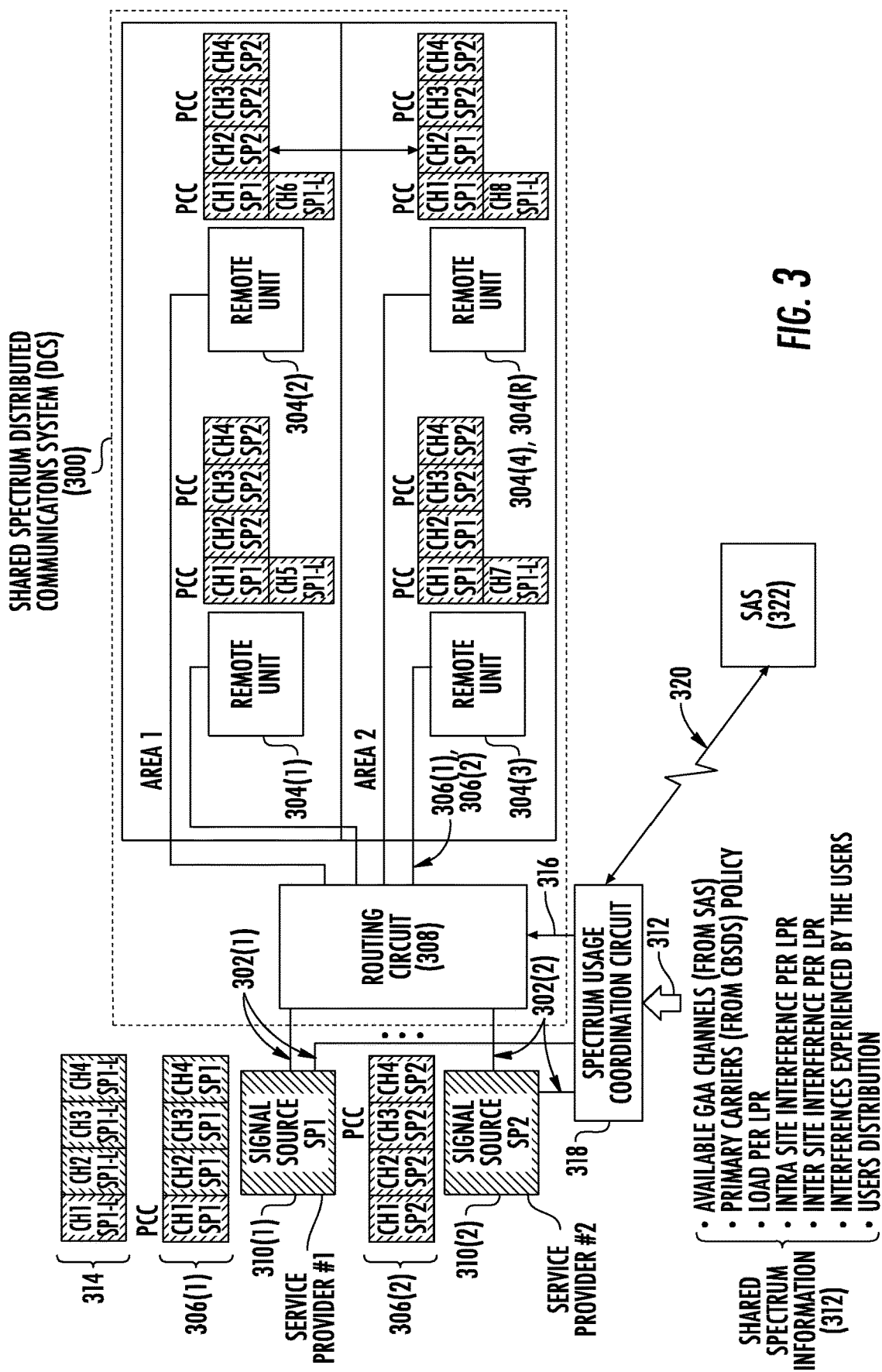
FIG. 3 is a schematic diagram of an exemplary shared spectrum distributed radio communications system ("distributed communications system (DCS)") configured to selectively route shared spectrum channels of downlink communications signals of multiple service providers to remote units based on shared spectrum input information used to determine spectrum usage coordination between the remote units.

FIG. 3 is a schematic diagram of an exemplary shared spectrum distributed communications system (DCS) 300 that is configured to selectively route shared spectrum channels of downlink communications signals 302(1), 302(2) from interfaced multiple service providers to remote units 304(1)-304(4), 304(1)-304(R). 'R' is four (4) in this example, but could be any number of remote units installed in the shared spectrum DCS 300 desired. Shared spectrum channels 306(1), 306(2) of received downlink communications signals 302(1), 302(2) are routed by a routing circuit 308 in the shared spectrum DCS 300 to the remote units 304(1)-304(R) to be distributed to subscriber units. Note that more than two (2) downlink communications signals 302(1), 302(2) may be received and routed. The subscriber units may be wireless communications devices that are configured to receive the shared spectrum channels 306(1), 306(2) wirelessly when radiated through respective antennas in the remote units 304(1)-304(R). For example, the routing circuit 308 may be a digital routing circuit that is configured to route digital signals representing the shared spectrum channels 306(1), 306(2). The shared spectrum channels 306(1), 306(2) may be digital baseband signals as an example. The routing circuit 308 may alternatively including an analog-to-digital (A/D) converter that is configured to convert the downlink communications signals 302(1), 302(2) as analog signals into digital signals to route the shared spectrum channels 306(1), 306(2). The routing circuit 308 may also be configured to receive and route analog shared spectrum channels 306(1), 306(2) from analog downlink communications signals 302(1), 302. In this example, the different service providers are represented by two (2) signal sources 310(1), 310(2), which are also known as "carriers" or "service operators." The service providers may be a mobile network operator (MNO) for example. Two (2) signal sources 310(1), 310(2) are shown in the shared spectrum DCS 300 in FIG. 3, but any number of signal sources 310(1), 310(2) for service providers may be interfaced with the shared spectrum DCS 300 according to its capabilities. The signal sources 310(1), 310(2) may be a base station that includes modem functionality (e.g., an Evolved Node B (eNodeB) in 4G or gNodeB in 5G). In this example, the signal sources 310(1), 310(2) are each capable of transmitting a plurality of shared spectrum channels 306(1), 306(2) that are shown as channels 1-4 CH1-CH4 in FIG. 3. For example, channels 14 CH1-CH4 that can be transmitted to the shared spectrum DCS 300 in downlink communications signal 302(1) by signal source 310(1) are shown as CH1 SP1, CH2 SP1, CH3 SP1, CH4 SP1 in FIG. 3. Channels 1-4 CH1-CH4 that can be transmitted to the shared spectrum DCS 300 in downlink communications signal 302(2) by signal source 310(2) are shown as CH1 SP2, CH2 SP2, CH3 SP2, CH4 SP2 in FIG. 3. As will be discussed in more detail below, the routing circuit 308 is configured to selectively distribute the transmitted shared spectrum channels 306(1), 306(2) in the received downlink communications signals 302(1), 302(2) to the remote units 304(1)-304(R) based on shared spectrum input information 312 to accomplish certain goals, such as load balancing and reducing interference as examples.

The signal sources 310(1), 310(2) in FIG. 3 are shared spectrum signal sources, meaning that they support communication of their respective downlink communications signals 302(1), 302(2) that include a frequency band(s) that is also supported with other signal sources 310(1), 310(2). For example, the signal sources 310(1), 310(2) may be configured to support communication of downlink communications signals 302(1), 302(N) in the CBRS, which has shared unlicensed frequencies as well as priority access licensed frequencies that can be used by different service providers or operators to transmit communications signals for their communications services. Thus, the downlink communications signals 302(1), 302(2) from the signal sources 310(1), 310(2) may include shared spectrum frequency channels CH1 SP1, CH2 SP1, CH3 SP1, CH4 SP1, CH1 SP2, CH2 SP2, CH3 SP2, CH4 SP2 that are the same or overlap being in the shared spectrum. For example, if channel CH1 SP1 is transmitted by the signal source 310(1) in downlink communications signal 302(1), it is in the same frequency band as channel CH1 SP2 transmitted by signal source 310(2) in downlink communications signal 302(2). The signal sources 310(1), 310(2) shown in FIG. 3 may also support transmission of licensed, or non-shared spectrum channels 314 (e.g., non-shared spectrum channels CH1-CH4 for service provider 1 CH5 SP1-L, CH6 SP1-L, CH7 SP1-L, CH8 SP1-L that do not overlap shared spectrum frequency channels CH1-CH4) in their downlink communications signals 302 (1), 302(2), meaning that a signal source 310(1), 310(2) could transmit channels in its respective downlink communications signal 302(1), 302(2) that does not overlap in frequency with channels transmitted by the other signal source 310(2), 310(1) in its respective downlink communications signal 302(2), 302(1). It may be desired for the shared spectrum DCS 300 to support multiple service providers that are capable of transmitting downlink communications signals 302(1), 302(2) in shared spectrum. For example, the signal sources 310(1), 310(2) may include additional data channels in the shared spectrum band to provide additional bandwidth to subscriber devices.

With continuing reference to FIG. 3, in this example, the remote units 304(1)-304(R) may include shared signal processing and distribution circuits for processing shared spectrum. Thus, it may be desired to not route the same channel CH1-CH4 from both signal sources 310(1), 310(2) to the same remote unit 304(1)-304(R) to avoid DCS intra-site interference in a remote unit 304(1)-304(R) in the shared spectrum DCS 300. This is shown in FIG. 3, where for example, shared spectrum channel 1 CH1 SP1 for service provider 1 from signal source 310(1) is routed by routing circuit 308 to remote unit 304(1), whereas channels 2-4 CH2 SP2, CH3 SP2, CH4 SP2 for service provider 2 from signal source 310(2) are routed to remote unit 304(1). Shared spectrum channel 1 for service provider 1 CH1 SP1 is designated by the signal source 310(1) as a primary component carrier (PCC), whereas shared spectrum channel 3 for service provider 2 CH3, SP2 is designated by the signal source 310(1) as a primary carrier channel (PCC). Non-shared spectrum channels CH5 SP1-L, CH6 SP1-L, CH7 SP1-L, CH8 SP-L from signal source 310(1) are shown as being routed by the routing circuit 308 to the respective remote units 304(1)-304(4). Because channel 1 CH1 SP1 for service provider 1 is routed to the remote unit 304(1), channel 1 CH1 SP2 for service provider 2 is not routed by the routing circuit 308 to the remote unit 304(1) to avoid interference in the remote unit 304(1). The routing circuit 308 is configured to allocate shared spectrum to the remote unit 304(1) to support providing communications services to subscriber devices of the remote unit 304(1) from either service provider 1, 2.

However, if it is determined that the capacity of remote unit 304(1) should be biased to supporting service provider 2, more channels for service provider 2 can be routed to the remote unit 304(1) as shown in FIG. 3. The shared spectrum DCS 300 is installed so that ideally, adjacent remote units such as remote units 304(1) and 304(2) are spatially separated to avoid interference in the event that the same channel distributed to remote units 304(1) and 304(2) is from different service providers 1, 2. In this example, the same shared spectrum channels CH1-CH4 from both service providers 1, 2 are not distributed by the routing circuit 308 to both remote units 304(1), 304(2) to avoid DCS intra-site interference between the remote units 304(1), 304(2) in this scenario. However, because the routing circuit 308 is capable of distributing any shared spectrum channel CH1-CH4 for any service provider 1, 2 to each remote unit 304(1)-304(R), it cannot be said that in all scenarios, the same shared spectrum channels CH1-CH4 for the different service providers 1, 2 will not be routed by the routing circuit 308 to the same remote unit 304(1), 304(2).

As also shown in FIG. 3, the remote units 304(1)-304(R) can be organized in different remote areas. For example, the remote units 304(1)-304(R) in FIG. 3 are organized in two different areas AREA 1 and AREA 2. For example, remote area AREA 1 may be a floor of a building, and remote area AREA 2 may be an adjacent floor of the building. The routing circuit 308 may be configured to selectively distribute the shared spectrum channels 306(1), 306(2) in the downlink communications signals 302(1), 302(2) to the remote units 304(1)-304(R) based on their location in the specific remote areas AREA 1 and AREA 2. For example, the routing circuit 308 can be configured to take the remote areas AREA 1, AREA 2 into consideration when routing the shared spectrum channels 306(1), 306(2) to the remote units 304(1)-304(R). For example, it may be important that each remote area AREA 1, AREA 2 includes a shared spectrum channel 306(1), 306(2) from each signal source 310(1), 310(2) for each service provider 1, 2 to provide sufficient coverage to subscriber units in each remote area. As shown in FIG. 3, a different set of shared spectrum channels CH1-CH4 are routed by the routing circuit 308 to the remote units 304(3), 304(R) in remote area AREA 2 than to the remote units 304(1), 304(2) in remote area AREA 1. Shared spectrum channels CH1 SP1, CH2 SP1, CH3 SP2, CH4 SP2 are distributed to the remote units 304(3), 304(R) in remote area AREA 2 by the routing circuit 308. As shown in the example in FIG. 3, channel 2 CH2 is routed from different service providers 1, 2 to remote unit 304(2) in remote area AREA 1 and remote unit 304(R) in remote area AREA 2. If the remote units 304(2), 304(R) are located too close to each other or if environmental conditions change, such that the transmission range of the remote units 304(2), 304(R) overlap with each other, intra-site interference between the remote units 304(2), 304(R) can occur by shared spectrum channel 2 of service provider 2 CH2, SP2 in remote unit 304(2) and shared spectrum channel 1 of service provider 1 CH2, SP1 in remote unit 304(R).

Thus, as shown in shared spectrum DCS 300 in FIG. 3, the routing circuit 308 communicatively coupled to the signal sources 310(1), 310(2) and the remote units 304(1)-304(R) is configured to receive the downlink communications signals 302(1), 302(2) from service providers via the signal sources 310(1), 310(2), wherein the downlink communications signals 302(1), 302(2) can include the same shared spectrum channels CH1-CH4 in a shared spectrum. The routing circuit 308 is configured to selectively distribute one or more of any shared spectrum channels CH1 SP1, CH2 SP1, CH3 SP1, CH4 SP1 in the received downlink communications signal 302(1) for service provider 1 and any shared spectrum channels CH1 SP2, CH2 SP2, CH3 SP2, CH4 SP2 in the received downlink communications signal 302(2) for service provider 2 to the remote units 304(1)-304(R) based on routing information 316. The routing information 316 in this example is received from a spectrum usage coordination circuit 318 that is communicatively coupled to the routing circuit 308. The spectrum usage coordination circuit 318 may be dedicated to the shared spectrum DCS 300 or provided as a circuit outside of the shared spectrum DCS 300 that is not dedicated to the shared spectrum DCS 300. The spectrum usage coordination circuit 318 may be configured to receive available shared spectrum channel information 320 from another system, such as a spectrum access system (SAS) 322 used in CBRS, to allocate shared spectrum to the remote units 304(1)-304(R) so as to not interfere with other surrounding area uses of the shared spectrum. The spectrum usage coordination circuit 318 is also configured to receive the shared spectrum input information 312 and use the shared spectrum input information 312 to determine how to allocate the received shared spectrum channels CH1-CH4 in the downlink communications signals 302(1), 302(2) for the service providers 1, 2 to particular remote units 304(1)-304(R). The spectrum usage coordination circuit 318 also receives the downlink communications signals 302(1), 302 (2) to analyze which shared spectrum channels CH1-CH4 are included in downlink communications signals 302(1), 302(2) from the signal sources 310(1), 310(2). Based on the available shared spectrum channel information 320 and/or the shared spectrum input information 312, the spectrum usage coordination circuit 318 allocates the shared spectrum channels CH1-CH4 in the received downlink communications signals 302(1), 302(2) from the signal sources 310(1), 310(2) to the remote units 304(1)-304(R) and includes this allocation information in the routing information 316 provided to the routing circuit 308. The routing circuit 308 uses the routing information 316 to selectively route the shared spectrum channels CH1-CH4 in the received downlink communications signals 302(1), 302(2) from the signal sources 310(1), 310(2) to the remote units 304(1)-304(R), an example of which is shown in FIG. 3. The routing circuit 308 also controls the routing of any non-shared spectrum channels CH1-CH4 in the received downlink communications signals 302(1), 302(2) from the signal sources 310(1), 310(2) to the remote units 304(1)-304(R).

Figure 4A:
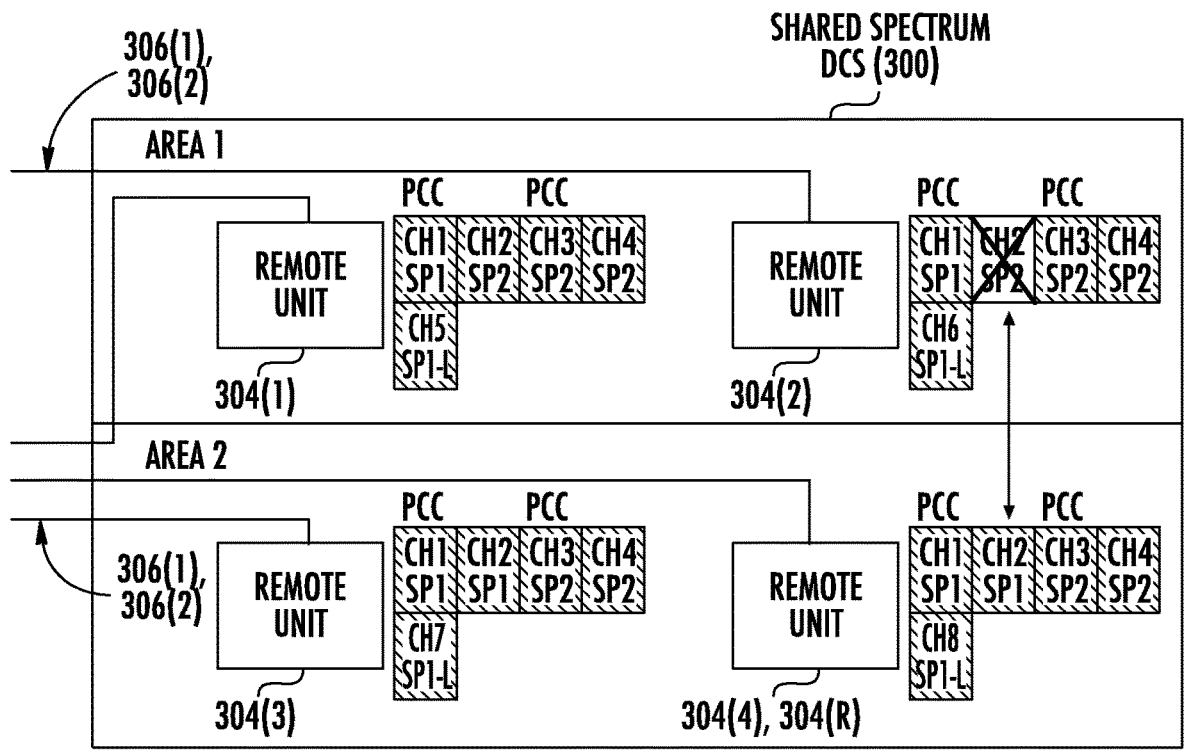
FIG. 4A is the shared spectrum DCS in FIG. 3 illustrating a spectrum usage coordination circuit instructing a routing circuit to not route a channel of a shared spectrum downlink communications signal for a service provider to a first remote unit based on determined intra-site interference with a second remote unit in the shared spectrum DCS receiving the same channel of the shared spectrum downlink communications signal for the service provider.
Figure 4B:
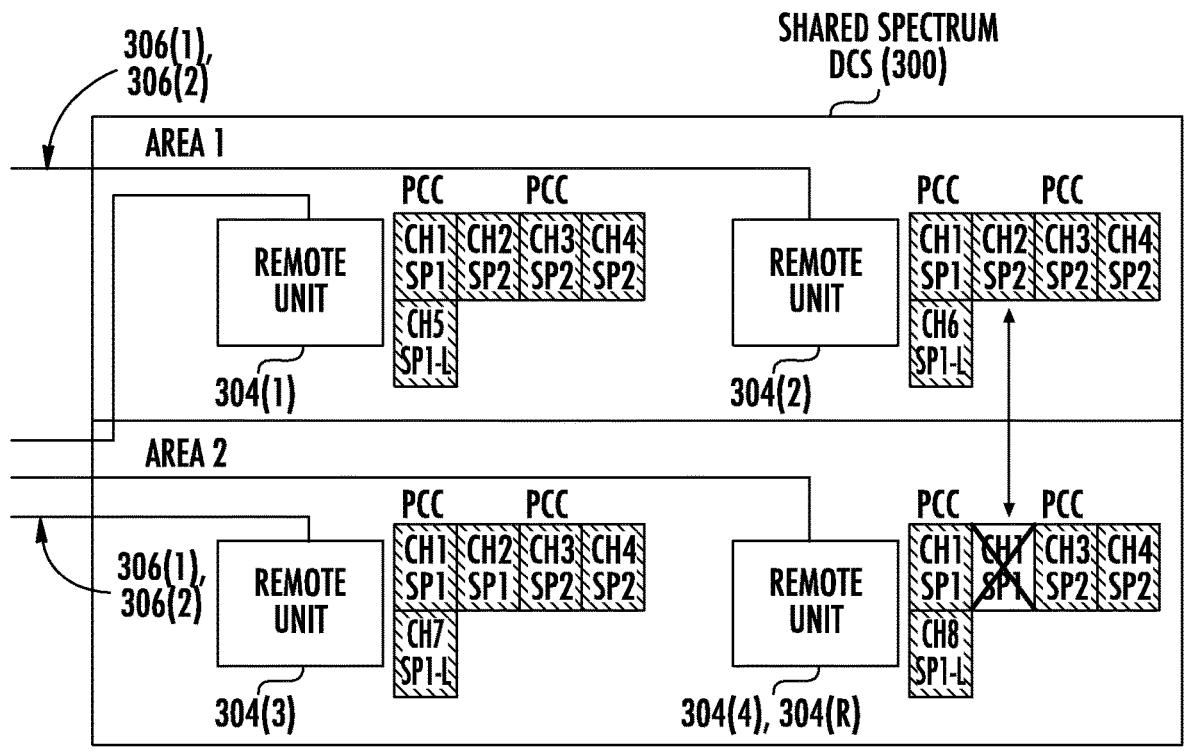
FIG. 4B is the shared spectrum DCS in FIG. 3 illustrating the spectrum usage coordination circuit instructing the routing circuit to not route a channel of a shared spectrum downlink communications signal for a service provider to the second remote unit based on determined intra-site interference with the first remote unit in the shared spectrum DCS receiving the same channel of the shared spectrum downlink communications signal for the service provider.

With continuing reference to FIG. 3, the spectrum usage coordination circuit 318 can be configured to determine how to allocate the received shared spectrum channels CH1-CH4 in the downlink communications signals 302(1), 302(2) for the service providers 1, 2 to each of the remote units 304(1)-304(R) in different manners. For example, the shared spectrum input information 312 could include intra-site interference information about communications signal interference between at least two remote units 304(1)-304(R) in the shared spectrum DCS 300, such as between the two remote units 304(2) and 304(4) discussed above with regard to shared spectrum channel 2 from service provider 1 CH2 SP1. In this instance, the spectrum usage coordination circuit 318 can use the information about this DCS intra-site interference from the shared spectrum input information 312 to change the allocation of shared spectrum channels to the remote units 304(1)-304(R) to reduce or avoid such DCS intra-site interference. For example, as shown in another diagram of the shared spectrum DCS 300 in FIG. 4A, to avoid or reduce the DCS intra-site interference between remote units 304(2) and 304(4) as a result of both receiving shared spectrum channel 2 from service provider 2 and service provider 1 CH2 SP2, CH2 SP1, respectively, the spectrum usage coordination circuit 318 could determine to de-allocate channel 2 from service provider 2 CH2 SP2 from remote unit 304(2). In this instance, the spectrum usage coordination circuit 318 can communicate this de-allocation in updated routing information 316 communicated to the routing circuit 308 of FIG. 3 so that the routing circuit 308 does not route shared spectrum channel 2 CH2 to remote unit 304(2). Alternatively, as shown in a diagram of the shared spectrum DCS 300 in FIG. 4B, to avoid or reduce the DCS intra-site interference between remote units 304(2) and 304(4) as a result of both receiving shared spectrum channel 2 CH2 from different service providers 1 and 2, the spectrum usage coordination circuit 318 could determine to de-allocate channel 2 from service provider 1 CH2 SP1 from remote unit 304(4) instead of de-allocating channel 2 from service provider 2 CH2 SP2 from remote unit 304(2). In this instance, the spectrum usage coordination circuit 318 can communicate this de-allocation in updated routing information 316 communicated to the routing circuit 308 so that the routing circuit 308 does not route shared spectrum channel 2 CH2 to remote unit 304(4).

Examples of how DCS intra-site interference may be detected is discussed in U.S. Pat. No. 9,642,094 B2 entitled "OPTIMIZING RADIO FREQUENCY (RF) COVERAGE IN REMOTE UNIT COVERAGE AREAS IN A WIRELESS DISTRIBUTION SYSTEM (WDS)," U.S. patent application Ser. No. 16/123,287 entitled "CHANNEL-BASED REMOTE UNIT MONITORING AND OPTIMIZATION IN A WIRELESS COMMUNICATIONS SYSTEM (WCS)," and U.S. Pat. No. 10,299,143 B2 entitled "MULTIPLE APPLICATION MODULES (MAMS) FOR MONITORING SIGNALS IN COMPONENTS IN WIRELESS DISTRIBUTION SYSTEMS, INCLUDING DISTRIBUTED ANTENNA SYSTEMS (DASS), AND RELATED SYSTEMS AND METHODS." all of which are incorporated by reference herein in their entireties.

Figure 5:
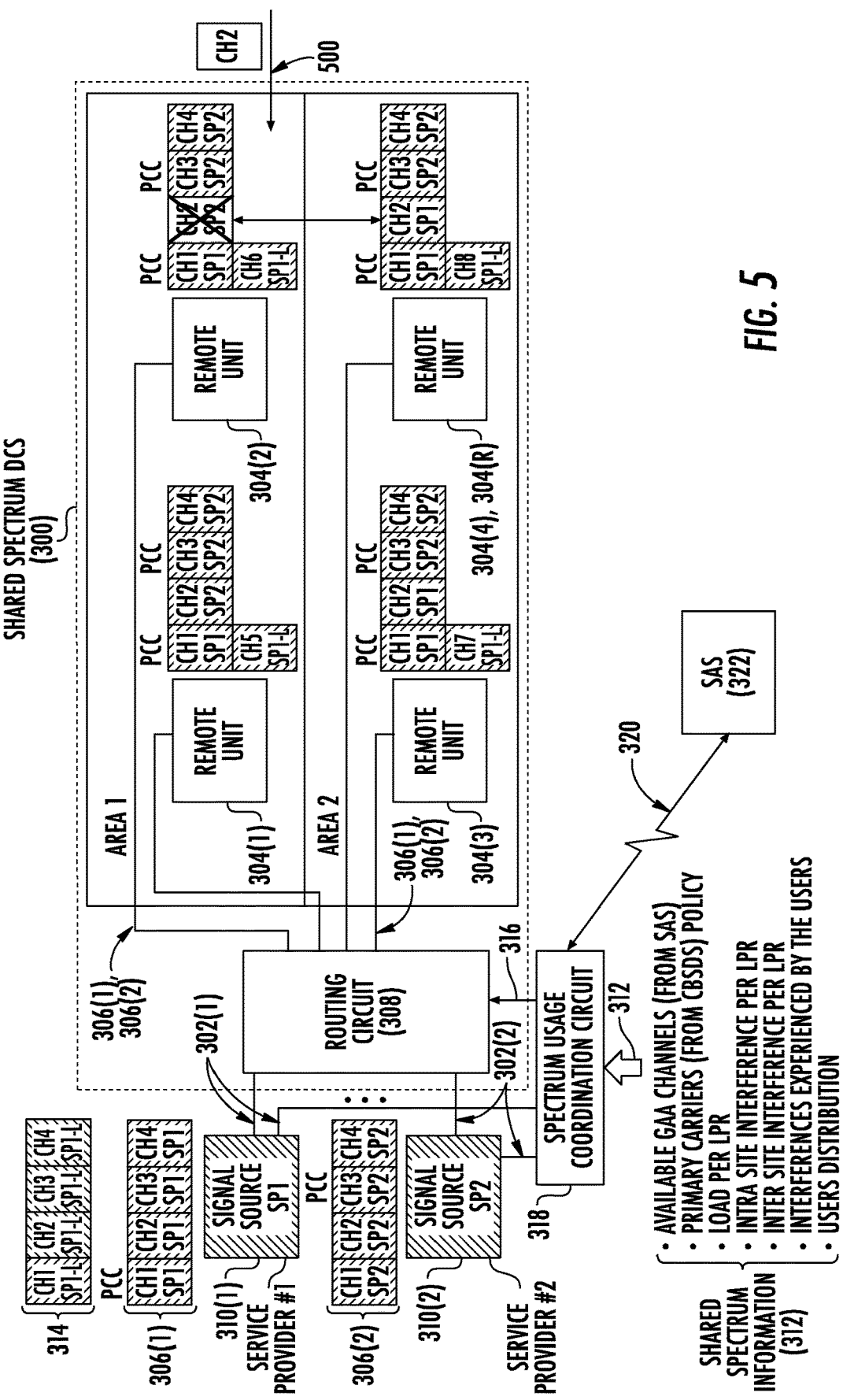
FIG. 5 is the shared spectrum DCS in FIG. 3 illustrating the spectrum usage coordination circuit instructing the routing circuit to not route a channel of a shared spectrum downlink communications signal for a service provider to a remote unit based on determined inter-site interference in the remote unit from a communications signal outside the DCS in the same channel of the shared spectrum.

Signal interference with a remote unit 304(1)-304(R) in the shared spectrum DCS 300 can also occur from communications signals outside the shared spectrum DCS 300, which is referred to as DCS "inter-site interference." For example, another shared spectrum radio transmitter may be located in close proximity to the shared spectrum DCS 300. For example, FIG. 5 is the shared spectrum DCS 300 in FIG. 3 illustrating a communications signal 500 that includes the same channel 2 as the shared spectrum channel 2 CH2 being received in remote area AREA 1 of the shared spectrum DCS 300. Thus, if the communications signal 500 is received by the remote unit 304(4) for example, the communications signal 500 may cause DCS inter-site interference as a result of the remote unit 304(4) processing the communications signal 500 along with the shared spectrum channel 2 from service provider 2 CH2 SP2. The shared spectrum input information 312 communicated to the spectrum usage coordination circuit 318 could include inter-site interference information about communications signal interference between a remote unit 304(1)-304(R) in the shared spectrum DCS 300, such as between the remote unit 304(4) and communications signal 500. In this instance, the spectrum usage coordination circuit 318 can use the information about this DCS inter-site interference from the shared spectrum input information 312 to change the allocation of shared spectrum channels to the remote units 304(1)-304(R) to reduce or avoid such DCS intra-site interference. For example, as shown in FIG. 5, to avoid or reduce the DCS inter-site interference between remote unit 304(4) as a result of receiving shared spectrum channel 2 from service provider 1 CH2 SP1 routed to remote unit 304(2) and inter-site interference from shared spectrum channel 2, the spectrum usage coordination circuit 318 could determine to de-allocate channel 2 from service provider 2 CH2 SP2 from remote unit 304(2). In this instance, the spectrum usage coordination circuit 318 can communicate this de-allocation in updated routing information 316 communicated to the routing circuit 308 so that the routing circuit 308 does not route shared spectrum channel 2 CH2 to remote unit 304(2).

Figure 6:
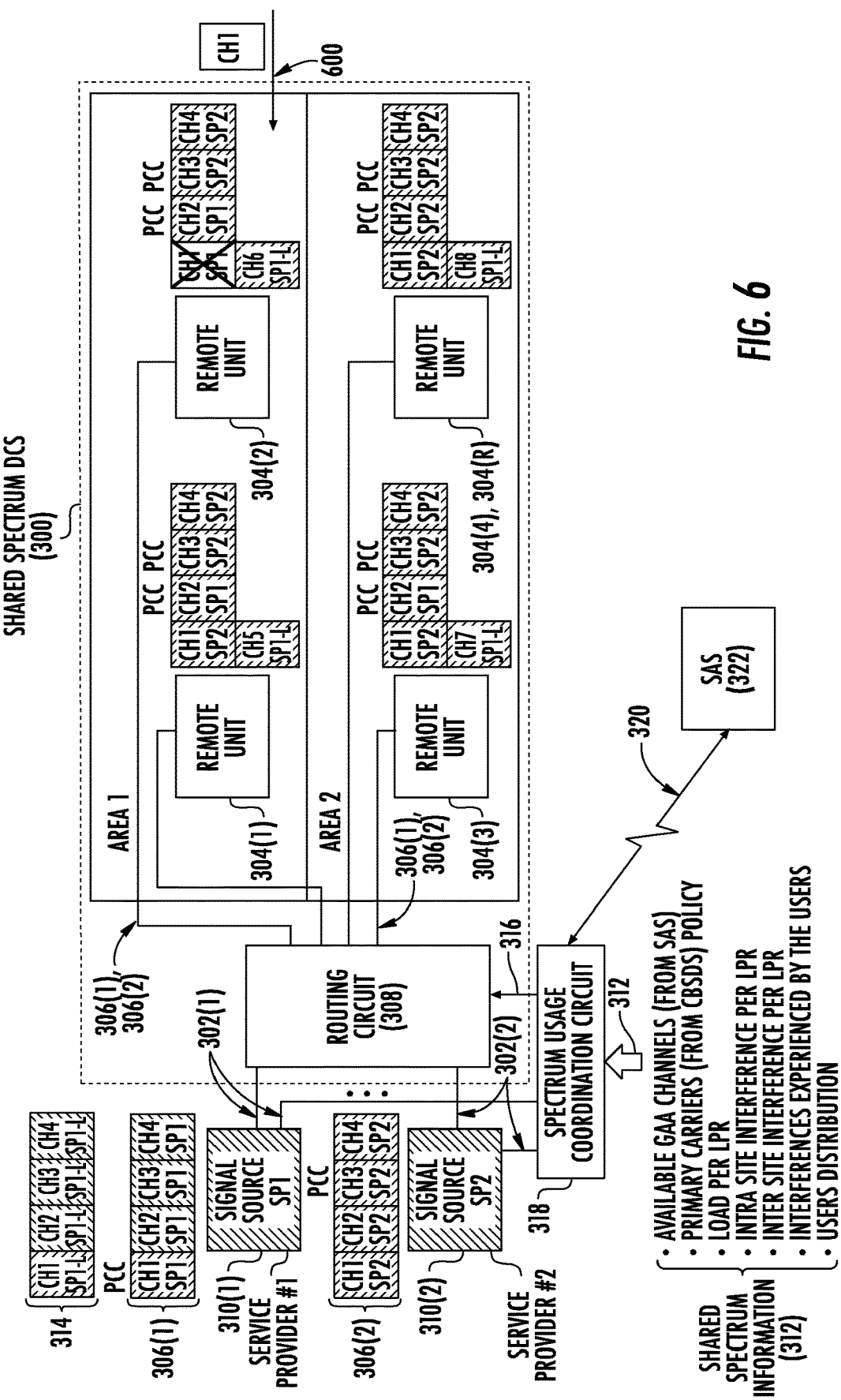
FIG. 6 is the shared spectrum DCS in FIG. 3 illustrating the spectrum usage coordination circuit instructing the routing circuit to reallocate a primary channel of a shared spectrum downlink communications signal for a service provider to be distributed to a remote unit(s) based on determined inter-site interference in a remote unit from a communication signals outside the DCS in the same primary channel of the shared spectrum.

Note that in the example of DCS inter-site interference in the shared spectrum DCS 300 illustrated in FIG. 5, the inter-site interference was between shared spectrum channel 2 in communications signal 500 and shared spectrum channel 2 from service provider 2 CH2 SP2. Shared spectrum channel 2 from service provider 2 CH2 SP2 is not a PCC for signal source 310(2) in this example, but rather shared spectrum channel 3 from service provider 2 CH3 SP2 is the designated PCC. Thus, de-allocating shared spectrum channel 2 from service provider 2 CH2 SP2 from remote unit 304(2) does not affect the designated PCC of signal source 310(2). However, FIG. 6 illustrates an example of DCS inter-site interference between a communications signal 600 that includes shared spectrum channel 1 CH1 interfering with remote unit's 304(2) receipt of spectrum channel 1 from service provider 2 CH1 SP2 as a PCC. Thus, it may not be desired to de-allocate spectrum channel 1 service provider 1 CH1 SP1 as a PCC for signal source 310(1) if there is interference with shared spectrum channel 1 CH1.

Thus, in the example of FIG. 6, in response to the spectrum usage coordination circuit 318 receiving the shared spectrum input information 312 indicating there is interference in a remote unit 304(1)-304(R) between a shared spectrum channel CH1-CH4 allocated to the remote unit 304(1)-304(R), the spectrum usage coordination circuit 318 can be configured to first determine if the interfering shared spectrum channel CH1-CH4 is a PCC for a service provider 1, 2. For example, shared spectrum channel 2 for service provider 2 in remote unit 304(2) is deemed to be in inter-interference with communications signal 600 in FIG. 6 according to the shared spectrum input information 312. If the spectrum usage coordination circuit 318 determines the interfering shared spectrum channel CH1-CH4 is a primary channel (i.e., PCC) for a service provider 1, 2, the spectrum usage coordination circuit 318 can be configured to allocate another shared spectrum channel CH1-CH4 as the primary channel for the service provider 1, 2 in the routing information 316. For example, as shown in FIG. 6, the spectrum usage coordination circuit 318 determines that the interfering spectrum channel 1 from service provider 1 CH1 SP1 is a primary channel. Thus, in this example, the spectrum usage coordination circuit 318 switches the primary channel for service provider 1 to shared spectrum channel 2 CH2 so that interfering spectrum channel 1 from service provider 1 CH1 SP1 can be de-allocated from remote unit 304(2). The spectrum usage coordination circuit 318 may be configured to communicate a request for a service provider 1, 2, to switch its primary shared spectrum channel. In the example in FIG. 6, because the spectrum usage coordination circuit 318 allocates channel 2 CH2 to serve as the primary channel for service provider 1, the spectrum usage coordination circuit 318 also de-allocates shared spectrum channel 2 from service provider 2 CH2 SP2 from the remote units 304(1)-304(R) as shown in FIG. 6.

Examples of how DCS inter-site interference may be detected is discussed U.S. Patent Application Publication No. 2018/0096543 A1 and U.S. Pat. No. 10,299,143 B2, both entitled "MULTIPLE APPLICATION MODULES (MAMS) FOR MONITORING SIGNALS IN COMPONENTS IN WIRELESS DISTRIBUTION SYSTEMS, INCLUDING DISTRIBUTED ANTENNA SYSTEMS (DASS), AND RELATED SYSTEMS AND METHODS," and U.S. patent application Ser. No. 16/123,287 entitled, "CHANNEL-BASED REMOTE UNIT MONITORING AND OPTIMIZATION IN A WIRELESS COMMUNICATIONS SYSTEM (WCS)," all of which are incorporated by reference herein in their entireties.

Other criteria may be included in the shared spectrum input information 312 received by the spectrum usage coordination circuit 318 that can be used to determine the allocation of shared spectrum channels CH1-CH4 of the signal sources 310(1), 310(2) in the shared spectrum DCS 300 in FIG. 3. For example, the shared spectrum input information 312 may include total throughput information for each service provider 1, 2. The spectrum usage coordination circuit 318 can determine how to allocate the shared spectrum channels CH1-CH4 of the signal sources 310(1), 310(2) in the shared spectrum DCS 300 to the remote units 304(1)-304(R) based on the throughput information. For example, if the signal source 310(1) actual throughput in the shared spectrum DCS 300 is determined to not be sufficient to achieve the desired throughput, more shared spectrum channels CH1-CH4 of the signal sources 310(1) can be allocated to the remote units 304(1)-304(R). On the other hand, if the actual throughput of signal source 310(1) is determined to be greater than the desired throughput for shared spectrum channels CH1-CH4 of the signal sources 310(1), less shared spectrum channels CH1-CH4 of the signal sources 310(1) can be allocated to the remote units 304(1)-304(R).

As another example, the shared spectrum input information 312 may include a primary channel designation policy received from a signal source 310(1), 310(2) that indicates which shared spectrum channel CH1-CH4 is designated by the service providers 1, 2 as the primary channel. In this manner, the spectrum usage coordination circuit 318 can ensure that any allocation of communications services from a service provider 1, 2 to a remote unit 304(1)-304(R) includes the shared spectrum channels CH1-CH4 for the service provider 1, 2 designated as the primary channel.

As another example, the shared spectrum input information 312 may include primary channel information or deduce the primary channel from information received from the signal sources 310(1), 310(2) that indicates which shared spectrum channel CH1-CH4 is designated by the service providers 1, 2 as the primary channel. The load information can include traffic load and/or signaling load in a remote unit 304(1)-304(R). Examples of how load of remote unit 304(1)-304(R) can be determined is discussed in U.S. Patent Application Publication No. 2017/0048732 A1 entitled "EVALUATING PERFORMANCE OF REMOTE UNITS ON A PER REMOTE UNIT BASIS IN A DISTRIBUTED ANTENNA SYSTEM (DAS)," which is incorporated by reference herein in its entirety. In one example, the absolute received uplink power in a remote unit 304(1)-304(R) can be used as an indirect method to determine remote unit 304(1)-304(R) load, which can include traffic and/or signaling load of the remote unit 304(1)-304(R). The greater the received uplink power in a remote unit 304(1)-304(R), usually, the greater the bandwidth of the received uplink communications signals. As another example, relative received uplink power (e.g., RSSI) in a remote unit 304(1)-304(R) can be used as an indirect method to determine remote unit 304(1)-304(R) load, which can include traffic and/or signaling load of a remote unit 304(1)-304(R). As another example, signaling load can be used as a method of determining load of a remote unit 304(1)-304(R), because the greater the signaling load, the greater the signaling overhead is involved in establishing or maintaining connections and disconnections of user equipment, thereby decreasing performance of the remote unit 304(1)-304(R). If the received uplink communications signal is not decoded, the upper and lower side power of the received uplink communications signals by a remote unit 304(1)-304(R) can also be used as an indirect method of determining signaling load of a remote unit 304(1)-304(R). For example, total absolute power may be used as an indicator of signaling control load when no sufficient traffic load exists. The spectrum usage coordination circuit 318 can be configured to determine which shared spectrum channels CH1-CH4 of the downlink communications signals 302(1), 302(2) to allocate to the remote units 304(1)-304(R) based on the load information about the remote units 304(1)-304(R) in the shared spectrum input information 312.

As another example, the shared spectrum input information 312 may include subscriber device interference information about interference experienced by a subscriber device in communication with a remote unit(s) 304(1)-304(R) based on the allocation of shared spectrum channels CH1-CH4 from the signal sources 310(1), 310(2) to the remote unit(s) 304(1)-304(R) that are distributed to subscriber devices. The load information can include traffic load and/or signaling load in a remote unit 304(1)-304(R). The spectrum usage coordination circuit 318 can be configured to determine which shared spectrum channels CH1-CH4 of the downlink communications signals 302(1), 302(2) to allocate to the remote units 304(1)-304(R) based on the subscriber device interference information about the remote units 304(1)-304(R) in the shared spectrum input information 312. The spectrum usage coordination circuit 318 can then adjust the routing information 316 to reflect the determined shared spectrum channel CH1-CH4 allocation. For example, subscriber device interference information may be handled like discussed above for remote unit 304(1)-304(R) DCS intra-site and/or inter-site interference, where the shared spectrum channel CH1-CH4 from the remote unit 304(1)-304(R) determined to cause the subscriber device interference is de-allocated from such remote unit 304(1)-304(R).

As another example, the shared spectrum input information 312 may include subscriber device distribution information about the distribution of subscriber devices in communication with the remote unit(s) 304(1)-304(R) in the shared spectrum DCS 300. The subscriber device can be used by the spectrum usage coordination circuit 318 to determine an allocation of shared spectrum channels 306(1)-306(2) to the remote units 304(1)-304(R) to provide the capacity from the service provider 1, 2 to serve the distribution of subscriber devices. For example, if a particular remote unit 304(1)-304(R) services more subscriber devices for service provider 1 than service provider 2, the spectrum usage coordination circuit 318 can be configured to allocate more shared spectrum channels CH1-CH4 from service provider 1 than service provider 2 to such remote unit 304(1)-304(R). The spectrum usage coordination circuit 318 can be configured to determine which shared spectrum channels CH1-CH4 of the downlink communications signals 302(1), 302(2) to allocate to the remote units 304(1)-304(R) based on the subscriber device distribution information to the remote units 304(1)-304(R) in the shared spectrum input information 312. The spectrum usage coordination circuit 318 can then adjust the routing information 316 to reflect the determined shared spectrum channel CH1-CH4 allocation.

Examples of how DCS intra-site interference may be detected is discussed U.S. Patent Application Publication No. 2017/0048732 A1 entitled "EVALUATING PERFORMANCE OF REMOTE UNITS ON A PER REMOTE UNIT BASIS IN A DISTRIBUTED ANTENNA SYSTEM (DAS)," U.S. Pat. Nos. 9,924,308 B2, 9,730,011 B2, 10,123,162 B2 each entitled "DETERMINING LOCATION OF CLIENT DEVICES IN A DISTRIBUTED ANTENNA SYSTEM (DAS) BASED ON DETECTING RECEIVED UPLINK POWER," and U.S. patent application Ser. No. 16/123,287 entitled "CHANNEL-BASED REMOTE UNIT MONITORING AND OPTIMIZATION IN A WIRELESS COMMUNICATIONS SYSTEM (WCS)," all of which are incorporated by reference herein in their entireties.

FIG. 7 is a flowchart illustrating an exemplary process 700 of a spectrum usage coordination circuit, such as the spectrum usage coordination circuit 318, in a shared spectrum DCS, such as the shared spectrum DCS 300 in FIG. 3, receiving shared spectrum input information and determining allocation of the shared spectrum from the multiple service providers to the remote units based on the shared spectrum input information to control routing of channels of the shared spectrum downlink communications signals to the remote units. The process 700 will be discussed in conjunction with the shared spectrum DCS 300 in FIG. 7 as an example. In this regard, the process 700 includes the shared spectrum DCS 300 receiving a plurality of downlink communications signals 302(1), 302(2) from a respective plurality of service providers, each downlink communications signal 302(1), 302(2) among the plurality of downlink communications signals 302(1), 302(2) comprising the same plurality of shared spectrum channels CH1-CH4 in a shared spectrum (block 702). The spectrum usage coordination circuit 318 receives the shared spectrum input information 312 (block 704). The spectrum usage coordination circuit 318 determines which shared spectrum channels CH1-CH4 of the plurality of downlink communications signals 302(1), 302(2) to allocate to the plurality of remote units 304(1)-304(R) based on the shared spectrum input information 312 (block 706). The spectrum usage coordination circuit 318 allocates the determined shared spectrum channels CH1-CH4 of the plurality of downlink communications signals 302(1), 302(2) to the plurality of remote units 304(1), 304(2) based on determined shared spectrum channels CH1-CH4 of plurality of downlink communications signals 302(1), 302 (2) to allocate to the plurality of remote units in routing information 316 (block 708). The routing circuit 308 selectively distributes one or more shared spectrum channels CH1-CH4 of the plurality of downlink communications signals 302(1), 302(2) to the plurality of remote units 304(1), 304(2) based on the routing information 316 (block 710).

Figure 8:
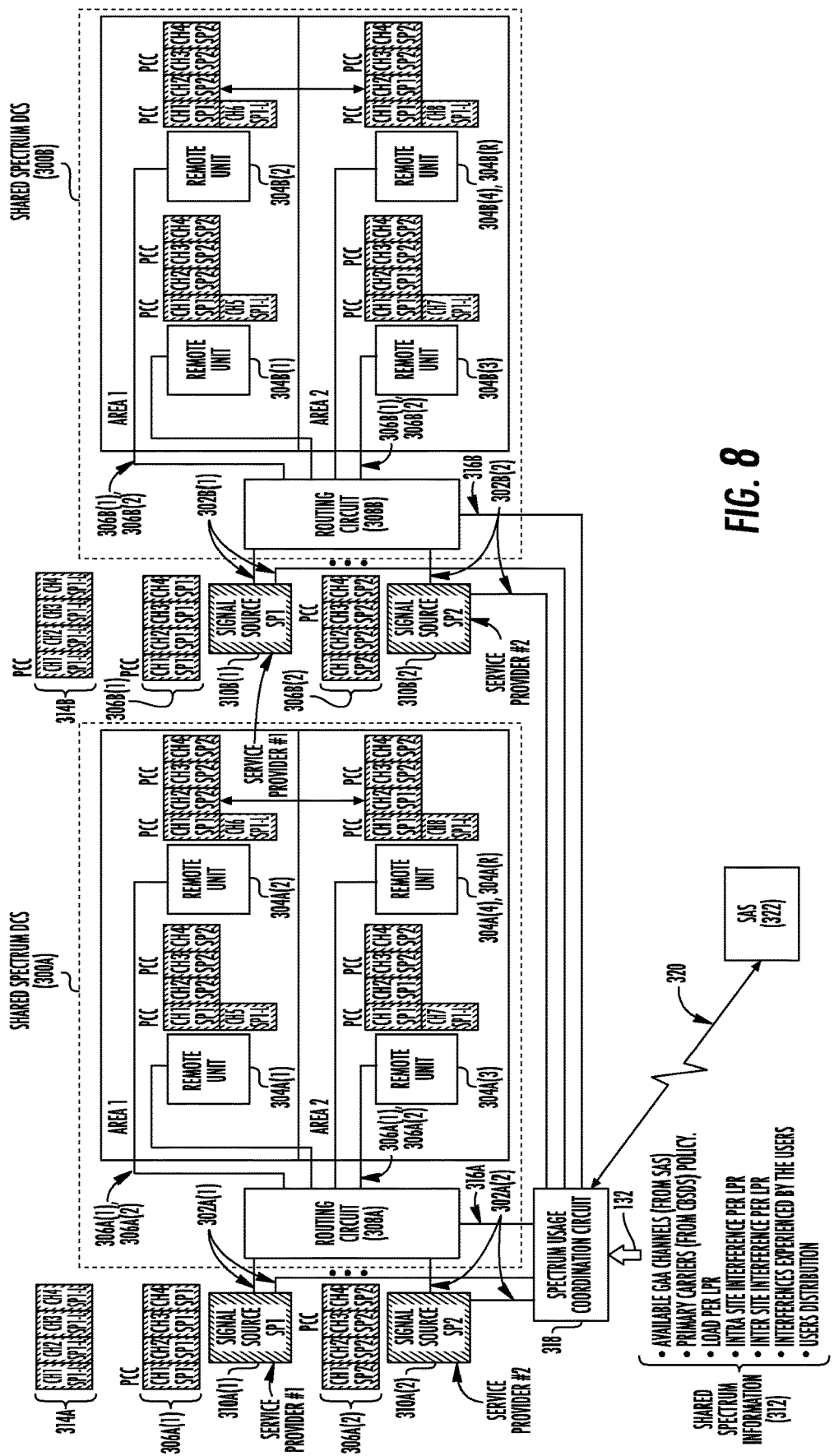
FIG. 8 illustrates multiple shared spectrum DCSs coordinating shared spectrum allocation in downlink communications signals from multiple service providers to remote units based on shared spectrum input information regarding the multiple shared spectrum DCSs.

A spectrum usage coordination circuit could also be provided that is configured to interface with multiple shared spectrum DCSs to allocate shared spectrum to remote units within each shared spectrum DCS. In this regard, FIG. 8 illustrates multiple shared spectrum DCSs 300A, 300B that are configured to receive routing information 316A, 316B from a common spectrum usage coordination circuit 318 based on shared spectrum input information 312A, 312B received regarding the multiple shared spectrum DCSs 300A, 300B. Common elements between the shared spectrum DCSs 300A, 300B in FIG. 8 and the shared spectrum DCS 300 in FIGS. 3-6 include common element numbers and will not be re-described. For example, signal source 310A(1) in the shared spectrum DCS 300A in FIG. 8 can be or include the functionality of signal source 310(1) in the shared spectrum DCS 300 in FIG. 3. All of the different types of information discussed above with regard to the shared spectrum DCS 300 can also be included in the shared spectrum input information 312A, 312B and used by the spectrum usage coordination circuit 318 to allocate shared spectrum channels CHA1-CHA4 and CHB1-CHB4 from respective signal sources 310A(1), 310A(2) and 310B(1), 310B(2) to their respective coupled shared spectrum DCSs 300A, 300B.

Any of the shared spectrum DCSs 300, 300A, 300B in FIGS. 3-6 and 8 may be configured to provide and support any type of communications services and/or other communications services beyond communication services. The communications circuits may support other RF communications services, which may include, but are not limited to, US FCC and Industry Canada frequencies (824-849 MHz on uplink and 869-894 MHz on downlink). US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, CBRS, WiMax, WiFi, Digital Subscriber Line (DSL), mmWave spectrum, 5G (NR), and LTE, etc.

Figure 9:
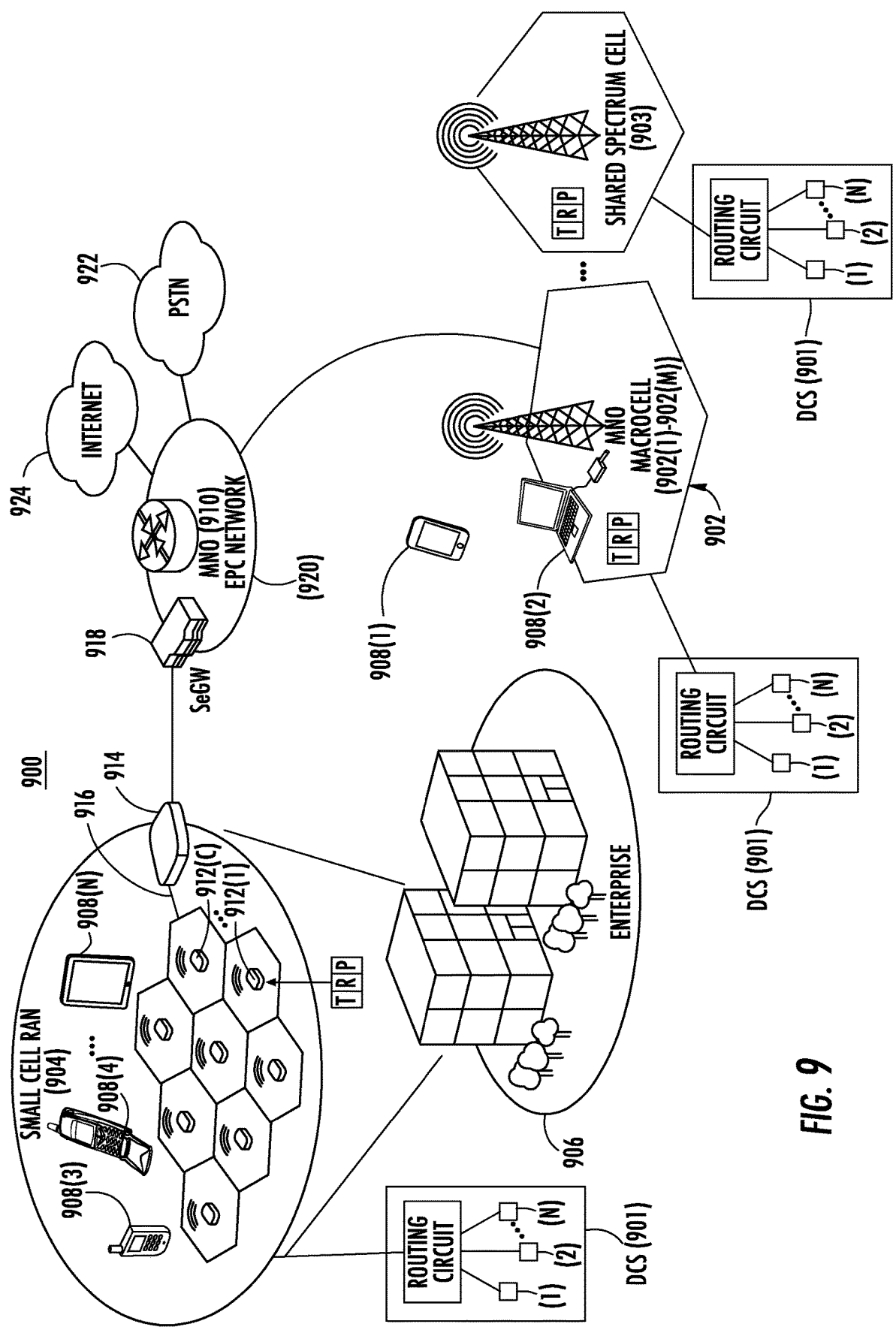
FIG. 9 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can employ or be coupled to a shared spectrum DCS configured to selectively route channels of shared spectrum downlink communications signals of multiple service providers to remote units based on shared spectrum input information used to determine spectrum usage coordination between the remote units, including but not limited to the distributed communications systems in FIGS. 3-6 and 8.

Shared spectrum DCSs supporting coordination of distribution of shared spectrum from multiple service providers to remote units to be distributed to subscriber devices, including the shared spectrum DCSs 300, 300A, 300B in FIGS. 3-6 and 8, can interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to a shared spectrum DCSs 901 supporting coordination of distribution of shared spectrum from multiple service providers to remote units to be distributed to subscriber devices. The shared spectrum DCSs 901 can include the shared spectrum DCSs 300, 300A, 300B in FIGS. 3-6 and 8 as examples.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for a user mobile communications device 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports citizens broadband radio service (CBRS). Also, as shown in FIG. 9, the MNO macrocell 902, the shared spectrum cell 903, and/or the small cell RAN 904 can interface with a shared spectrum DCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of user mobile communications devices 908(3)-908(N).

In FIG. 9, the mobile telecommunications environment 900 in this example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise 906 in which the small cell RAN 904 is implemented. The small cell RAN 904 includes a plurality of small cell radio nodes (RNs) 912(1)-912(C). Each small cell radio node 912(1)-912(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g, evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g. EPC network in a 4G network, or 5G Core in a 5G network) through either a macrocell 902 or small cell radio node 912(1)-912(C) in the small cell RAN 904 in the environment 900.

Figure 10:
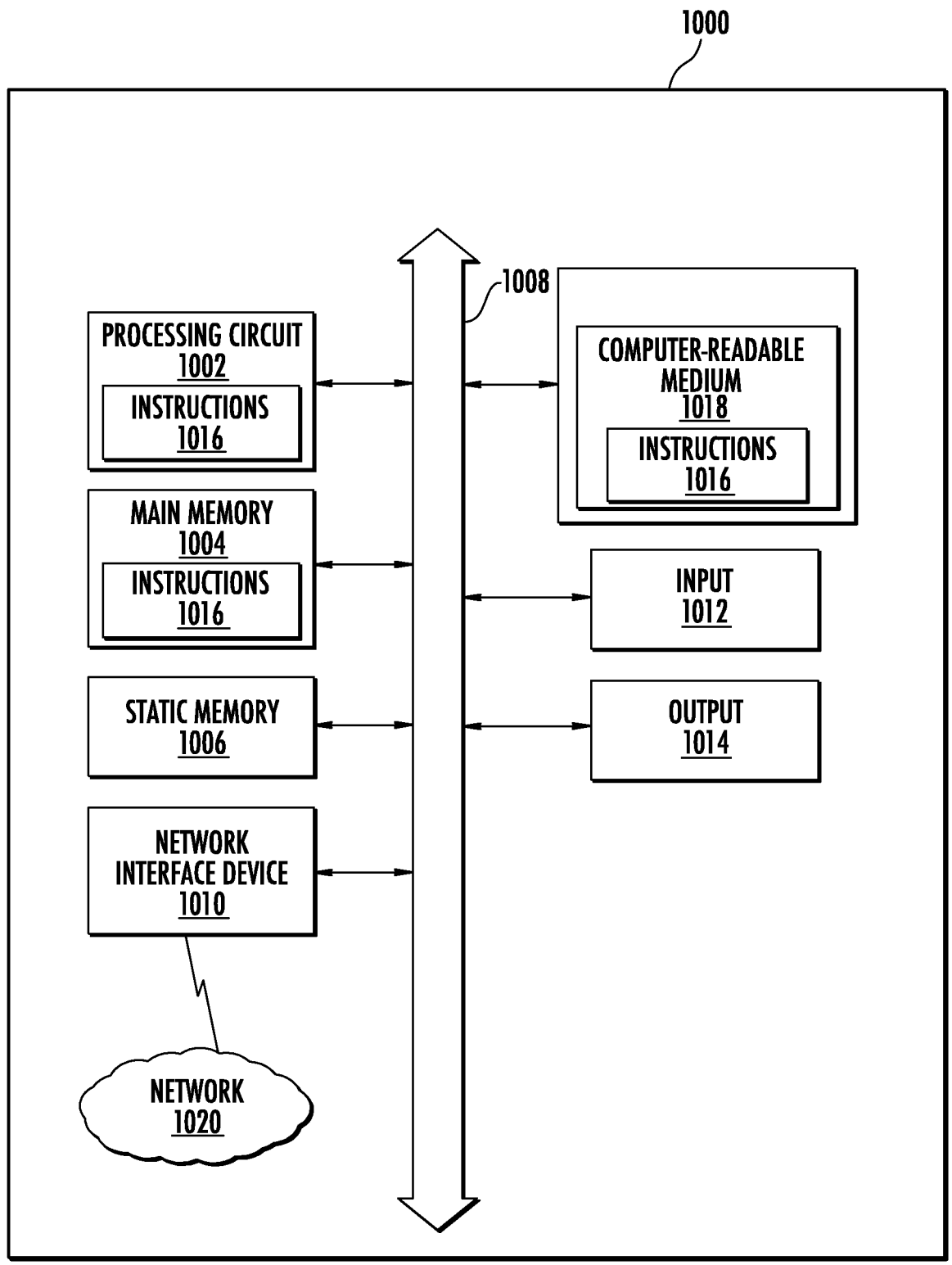
FIG. 10 is a schematic diagram of a representation of an exemplary computer system that can be included in or interface with any of the components in the distributed communications systems in FIGS. 3-6 and 8, including their routing circuits, spectrum usage coordination circuits, and remote units, wherein the exemplary computer system is configured to execute instructions from an exemplary computer-readable media.

Any of the circuits in the shared spectrum DCSs 300, 300A, 300B in FIGS. 3-6 and 8 can include a computer system 1000, such as shown in FIG. 10, to carry out their functions and operations. With reference to FIG. 10, the computer system 1000 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM). Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A distributed communications system (DCS) comprising:
a routing circuit configured to:
receive a plurality of downlink communications signals from a respective plurality of service providers, each downlink communications signal among the plurality of downlink communications signals comprising a same plurality of shared spectrum channels in a shared spectrum; and
selectively distribute one or more shared spectrum channels of the plurality of shared spectrum channels of the plurality of downlink communications signals to a plurality of remote units based on routing information; and
a spectrum usage coordination circuit communicatively coupled to the routing circuit, the spectrum usage coordination circuit configured to:
receive shared spectrum input information;
determine which shared spectrum channels of the plurality of downlink communications signals to allocate to the plurality of remote units based on the shared spectrum input information;
allocate the determined shared spectrum channels of the plurality of downlink communications signals to the plurality of remote units based on the determined shared spectrum channels of plurality of downlink communications signals to allocate to the plurality of remote units in the routing information;
communicate the routing information to the routing circuit, wherein:
the shared spectrum input information comprises intra-site interference information in the DCS, the intra-site interference information comprises information about signal interference between at least two remote units among the plurality of remote units;
the spectrum usage coordination circuit is configured determine which shared spectrum channels of the plurality of downlink communications signals to allocate to the plurality of remote units based on the intra-site interference information;
the spectrum usage coordination circuit is configured to determine which shared spectrum channels of the plurality of downlink communications signals to allocate to the plurality of remote units based on the shared spectrum input information, by being configured to:
determine that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a second downlink communications signal among the plurality of downlink communications signals for a second service provider among the plurality of service providers allocated to a second remote unit among the plurality of remote units; and in response to determining the first shared spectrum channel in the first downlink communications signal allocated to the first remote unit interferes with the first shared spectrum channel in the second downlink communications signal allocated to the second remote unit, the spectrum usage coordination circuit is further configured to de-allocate the first shared spectrum channel of the first downlink communications signal from the first remote unit in the routing information.

2. The DCS of claim 1, wherein the spectrum usage coordination circuit is configured to allocate the determined shared spectrum channels of the plurality of downlink communications signals to the plurality of remote units based on the determined shared spectrum channels of plurality of downlink communications signals to allocate to the plurality of remote units in the routing information, such that a same shared spectrum channel for two or more downlink communications signals of the plurality of downlink communications signals is not allocated to a same remote unit among the plurality of remote units.

3. A distributed communications system (DCS) comprising:
a routing circuit configured to:
receive a plurality of downlink communications signals from a respective plurality of service providers, each downlink communications signal among the plurality of downlink communications signals comprising a same plurality of shared spectrum channels in a shared spectrum; and
selectively distribute one or more shared spectrum channels of the plurality of shared spectrum channels of the plurality of downlink communications signals to a plurality of remote units based on routing information; and
a spectrum usage coordination circuit communicatively coupled to the routing circuit, the spectrum usage coordination circuit configured to:
receive shared spectrum input information;
determine which shared spectrum channels of the plurality of downlink communications signals to allocate to the plurality of remote units based on the shared spectrum input information;
allocate the determined shared spectrum channels of the plurality of downlink communications signals to the plurality of remote units based on the determined shared spectrum channels of plurality of downlink communications signals to allocate to the plurality of remote units in the routing information; and
communicate the routing information to the routing circuit, wherein:
the shared spectrum input information comprises inter-site interference information in the DCS, the inter-site interference information comprises information about signal interference between at least one remote unit among the plurality of remote units and another communications signal outside the DCS;
the spectrum usage coordination circuit is configured determine which shared spectrum channels of the plurality of downlink communications signals to allocate to the plurality of remote units based on the inter-site interference information;

the spectrum usage coordination circuit is configured to determine which shared spectrum channels of the plurality of downlink communications signals to allocate to the plurality of remote units based on the shared spectrum input information, by being configured to:
determine that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a communications signal outside the DCS; and
in response to determining that the first shared spectrum channel in the first downlink communications signal allocated to the first remote unit interferes with the first shared spectrum channel in the communications signal outside the DCS, the spectrum usage coordination circuit is further configured to de-allocate the first shared spectrum channel of the first downlink communications signal from the first remote unit in the routing information.

4. The DCS of claim 3, wherein, in response to determining that the first shared spectrum channel in the first downlink communications signal allocated to the first remote unit interferes with the first shared spectrum channel in the communications signal outside the DCS, the spectrum usage coordination circuit is further configured to:
determine if the first shared spectrum channel of the first downlink communications signal in the first remote unit is a primary channel for the first service provider;
in response to determining that the first shared spectrum channel of the first downlink communications signal in the first remote unit is the primary channel for the first service provider:
allocate a second shared spectrum channel of the first downlink communications signal as the primary channel for the first service provider in the routing information.

5. A distributed communications system (DCS) comprising:
a routing circuit configured to:
receive a plurality of downlink communications signals from a respective plurality of service providers, each downlink communications signal among the plurality of downlink communications signals comprising a same plurality of shared spectrum channels in a shared spectrum; and
selectively distribute one or more shared spectrum channels of the plurality of shared spectrum channels of the plurality of downlink communications signals to a plurality of remote units based on routing information; and
a spectrum usage coordination circuit communicatively coupled to the routing circuit, the spectrum usage coordination circuit configured to:
receive shared spectrum input information;
determine which shared spectrum channels of the plurality of downlink communications signals to allocate to the plurality of remote units based on the shared spectrum input information;
allocate the determined shared spectrum channels of the plurality of downlink communications signals to the plurality of remote units based on the determined shared spectrum channels of plurality of downlink communications signals to allocate to the plurality of remote units in the routing information; and communicate the routing information to the routing circuit, wherein:

the shared spectrum input information comprises inter-site interference information in the DCS, the inter-site interference information comprises information about signal interference between at least one remote unit among the plurality of remote units and another communications signal outside the DCS;

the spectrum usage coordination circuit is configured determine which shared spectrum channels of the plurality of downlink communications signals to allocate to the plurality of remote units based on the inter-site interference information;

the spectrum usage coordination circuit is configured to determine which shared spectrum channels of the plurality of downlink communications signals to allocate to the plurality of remote units based on the shared spectrum input information, by being configured to:

determine that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a communications signal outside the DCS; and in response to determining that the first shared spectrum channel in the first downlink communications signal allocated to the first remote unit interferes with the first shared spectrum channel in the communications signal outside the DCS, the spectrum usage coordination circuit is further configured to:

determine if the first shared spectrum channel of the first downlink communications signal in the first remote unit is a primary channel for the first service provider; and in response to determining that the first shared spectrum channel of the first downlink communications signal in the first remote unit is the primary channel for the first service provider, allocate a second shared spectrum channel of the first downlink communications signal as the primary channel for the first service provider in the routing information.

6. The DCS of claim 5, wherein, in response to determining that the first shared spectrum channel of the first downlink communications signal in the first remote unit is the primary channel for the first service provider, the spectrum usage coordination circuit is further configured to:

determine if all other shared spectrum channels of the first downlink communications signal other than the first shared spectrum channel are allocated to a second downlink communications signal among the plurality of downlink communications signals for a second service provider among the plurality of service providers allocated to a second remote unit among the plurality of remote units; and in response to determining that all the other shared spectrum channels of the first downlink communications signal are allocated to the second downlink communications signal:

de-allocate a second shared spectrum channel of the second downlink communications signal from the second remote unit in the routing information;

allocate the second shared spectrum channel of the first downlink communications signal to the first remote unit in the routing information; and allocate the first shared spectrum channel of the second downlink communications signal to the second remote unit in the routing information.

7. The DCS of claim 1, wherein:

the shared spectrum input information comprises available shared spectrum channel information in the shared spectrum from a spectrum access system for the shared spectrum; and the spectrum usage coordination circuit is configured determine which shared spectrum channels of the plurality of downlink communications signals to allocate to the plurality of remote units based on the available shared spectrum channel information.

8. The DCS of claim 1, wherein:

the shared spectrum input information comprises a primary channel designation policy for at least one service provider among the plurality of service providers; and the spectrum usage coordination circuit is configured determine which shared spectrum channels of the plurality of downlink communications signals to allocate to the plurality of remote units based on the primary channel designation policy for the at least one service provider.

9. The DCS of claim 1, wherein:

the shared spectrum input information comprises load information for the plurality of remote units among the plurality of remote units; and the spectrum usage coordination circuit is configured determine which shared spectrum channels of the plurality of downlink communications signals to allocate to the plurality of remote units based on the load information.

10. The DCS of claim 9, further configured to:

analyze the plurality of shared spectrum channels in the received plurality of downlink communications signals to the plurality of remote units to determine a traffic load for each remote unit among the plurality of remote units; and generate the load information based on the analyzed plurality of shared spectrum channels allocated from the received plurality of downlink communications signals to the plurality of remote units.

11. The DCS of claim 1, wherein:

the shared spectrum input information comprises subscriber device interference information comprising information about any interference with a plurality of subscriber devices; and the spectrum usage coordination circuit is configured determine which shared spectrum channels of the plurality of downlink communications signals to allocate to the plurality of remote units based on the subscriber device interference information.

12. The DCS of claim 1, wherein:

the shared spectrum input information comprises subscriber device distribution information comprising information about the number of subscriber devices supported by each remote unit among the plurality of remote units; and the spectrum usage coordination circuit is configured determine which shared spectrum channels of the plurality of downlink communications signals to allocate to the plurality of remote units based on the subscriber device distribution information.

13. The DCS of claim 1, wherein the routing circuit is further configured to:
receive a plurality of licensed downlink communications signals from the respective plurality of service providers, each licensed downlink communications signal among the plurality of licensed downlink communications signals having a spectrum outside of the shared spectrum, the plurality of licensed downlink communications signals each comprising one or more licensed spectrum channels; and
selectively distribute the one or more licensed spectrum channels of the plurality of licensed downlink communications signals to the plurality of remote units.

14. A method of routing shared spectrum channels of downlink communications signals of a plurality of service providers to a plurality of remote units in a distributed communications system (DCS), comprising:
receiving a plurality of downlink communication signals from a respective plurality of service providers, each downlink communications signal among the plurality of downlink communications signals comprising a same plurality of shared spectrum channels in a shared spectrum;
receiving shared spectrum input information;
determining which shared spectrum channels of the plurality of downlink communications signals to allocate to a plurality of remote units based on the shared spectrum input information;
allocating the determined shared spectrum channels of the plurality of downlink communications signals to the plurality of remote units based on the determined shared spectrum channels of plurality of downlink communications signals to allocate to the plurality of remote units in routing information;
selectively distributing one or more shared spectrum channels of the plurality of downlink communications signals to the plurality of remote units based on the routing information;
determining that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a communications signal outside the DCS;
in response to determining that the first shared spectrum channel in the first downlink communications signal allocated to the first remote unit interferes with the first shared spectrum channel in the communications signal outside the DCS: and
de-allocating the first shared spectrum channel of the first downlink communications signal from the first remote unit in the routing information.

15. The method of claim 14, comprising allocating the determined shared spectrum channels of the plurality of downlink communications signals to the plurality of remote units based on the determined shared spectrum channels of plurality of downlink communications signals to allocate to the plurality of remote units in the routing information such that a same shared spectrum channel for two or more downlink communications signals of the plurality of downlink communications signals is not allocated to a same remote unit among the plurality of remote units.

16. A method of routing shared spectrum channels of downlink communications signals of a plurality of service providers to a plurality of remote units in a distributed communications system (DCS), comprising:
receiving a plurality of downlink communication signals from a respective plurality of service providers, each downlink communications signal among the plurality of downlink communications signals comprising a same plurality of shared spectrum channels in a shared spectrum;
receiving shared spectrum input information;
determining which shared spectrum channels of the plurality of downlink communications signals to allocate to a plurality of remote units based on the shared spectrum input information;
allocating the determined shared spectrum channels of the plurality of downlink communications signals to the plurality of remote units based on the determined shared spectrum channels of plurality of downlink communications signals to allocate to the plurality of remote units in routing information;
selectively distributing one or more shared spectrum channels of the plurality of downlink communications signals to the plurality of remote units based on the routing information;
determining that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a second downlink communications signal among the plurality of downlink communications signals for a second service provider among the plurality of service providers allocated to a second remote unit among the plurality of remote units; and
in response to determining that the first shared spectrum channel in the first downlink communications signal allocated to the first remote unit interferes with the first shared spectrum channel in the second downlink communications signal allocated to the second remote unit:
de-allocating the first shared spectrum channel of the first downlink communications signal from the first remote unit in the routing information.

17. The method of claim 14, wherein, in response to determining that the first shared spectrum channel in the first downlink communications signal allocated to the first remote unit interferes with the first shared spectrum channel in the communications signal outside the DCS, further comprising:
determining if the first shared spectrum channel of the first downlink communications signal in the first remote unit is a primary channel for the first service provider; and
in response to determining that the first shared spectrum channel of the first downlink communications signal in the first remote unit is the primary channel for the first service provider:
allocating a second shared spectrum channel of the first downlink communications signal as the primary channel for the first service provider in the routing information.

18. A method of routing shared spectrum channels of downlink communications signals of a plurality of service providers to a plurality of remote units in a distributed communications system (DCS), comprising:

receiving a plurality of downlink communication signals from a respective plurality of service providers, each downlink communications signal among the plurality of downlink communications signals comprising a same plurality of shared spectrum channels in a shared spectrum;

receiving shared spectrum input information;

determining which shared spectrum channels of the plurality of downlink communications signals to allocate to a plurality of remote units based on the shared spectrum input information;

allocating the determined shared spectrum channels of the plurality of downlink communications signals to the plurality of remote units based on the determined shared spectrum channels of plurality of downlink communications signals to allocate to the plurality of remote units in routing information;

selectively distributing one or more shared spectrum channels of the plurality of downlink communications signals to the plurality of remote units based on the routing information;

determining that a first shared spectrum channel in the shared spectrum in a first downlink communications signal among the plurality of downlink communications signals for a first service provider among the plurality of service providers allocated to a first remote unit among the plurality of remote units interferes with the first shared spectrum channel in the shared spectrum in a communications signal outside the DCS; and in response to determining that the first shared spectrum channel in the first downlink communications signal allocated to the first remote unit interferes with the first shared spectrum channel in the communications signal outside the DCS, further comprising:

determining if the first shared spectrum channel of the first downlink communications signal in the first remote unit is a primary channel for the first service provider; and in response to determining that the first shared spectrum channel of the first downlink communications signal in the first remote unit is the primary channel for the first service provider:

allocating a second shared spectrum channel of the first downlink communications signal as the primary channel for the first service provider in the routing information.

19. The method of claim 14, comprising determining which shared spectrum channels of the plurality of downlink communications signals to allocate to the plurality of remote units based on an available shared spectrum channel information in the shared spectrum from a spectrum access system for the shared spectrum.

20. The method of claim 14, comprising determining which shared spectrum channels of the plurality of downlink communications signals to allocate to the plurality of remote units based on a primary channel designation policy for at least one service provider.

21. The method of claim 14, comprising determining which shared spectrum channels of the plurality of downlink communications signals to allocate to the plurality of remote units based on load information for the plurality of remote units among the plurality of remote units.

22. The method of claim 14, comprising determining which shared spectrum channels of the plurality of downlink communications signals to allocate to the plurality of remote units based on subscriber device interference information comprising information about any interference with a plurality of subscriber devices.

23. The method of claim 14, comprising determining which shared spectrum channels of the plurality of downlink communications signals to allocate to the plurality of remote units based on subscriber device distribution information comprising information about the number of subscriber devices supported by each remote unit among the plurality of remote units.

* * * * *